(12) United States Patent
Colombo

(10) Patent No.: US 11,068,255 B2
(45) Date of Patent: Jul. 20, 2021

(54) PROCESSING SYSTEM, RELATED INTEGRATED CIRCUIT, DEVICE AND METHOD

(71) Applicant: STMicroelectronics Application GMBH, Aschheim-Dornach (DE)

(72) Inventor: Roberto Colombo, Munich (DE)

(73) Assignee: STMicroelectronics Application GmbH, Aschheim-Dornach (DE)

( * ) Notice: Subject to any disclaimer, the term of this patent is extended or adjusted under 35 U.S.C. 154(b) by 0 days.

(21) Appl. No.: 16/829,280

(22) Filed: Mar. 25, 2020

(65) Prior Publication Data

US 2020/0319876 A1 Oct. 8, 2020

(30) Foreign Application Priority Data

Apr. 3, 2019 (IT) .................. 102019000005020

(51) Int. Cl.
| | | |
|---|---|---|
| *G06F 9/44* | (2018.01) | |
| *G06F 21/57* | (2013.01) | |
| *G06F 9/445* | (2018.01) | |
| *G06F 1/24* | (2006.01) | |
| *G06F 9/4401* | (2018.01) | |
| *G06F 8/654* | (2018.01) | |
| *G06F 11/27* | (2006.01) | |
| *G06F 12/10* | (2016.01) | |

(52) U.S. Cl.
CPC .............. *G06F 8/654* (2018.02); *G06F 11/27* (2013.01); *G06F 12/10* (2013.01)

(58) Field of Classification Search
CPC ...... G06F 21/575; G06F 11/27; G06F 9/4401; G06F 8/65; G06F 8/654; G06F 12/10; H04L 67/12
See application file for complete search history.

(56) References Cited

U.S. PATENT DOCUMENTS

| | | | | |
|---|---|---|---|---|
| 10,055,296 | B2 * | 8/2018 | Su ........................ | G06F 9/4403 |
| 10,586,048 | B2 * | 3/2020 | Lu ........................ | G06F 9/442 |
| 2016/0098266 | A1 | 4/2016 | Martin et al. | |
| 2019/0018669 | A1 | 1/2019 | Cook et al. | |

OTHER PUBLICATIONS

Schneider Electric, UPS Network Management Card 2—User's Guide, 88 pages (Year: 2014).*

* cited by examiner

*Primary Examiner* — Thuy Dao
(74) *Attorney, Agent, or Firm* — Slater Matsil, LLP

(57) ABSTRACT

A processing system includes a digital processing unit, one or more non-volatile memories configured to store a firmware to be executed by the digital processing unit, a diagnostic circuit configured to execute a self-test operation of the processing system in response to a diagnostic mode enable signal, and a reset circuit. The reset circuit is configured to perform a complex reset of the processing system by generating a first reset of the processing system in response to a given event and generating a second reset of the processing system once the self-test operation has been executed. The processing system is configured to set the diagnostic mode enable signal in response to the first reset, thereby activating execution of the self-test operation.

20 Claims, 9 Drawing Sheets

PROCESSING SYSTEM, RELATED INTEGRATED CIRCUIT, DEVICE AND METHOD

CROSS-REFERENCE TO RELATED APPLICATIONS

This application claims priority to Italian Patent Application No. 102019000005020, filed on Apr. 3, 2019, which application is hereby incorporated herein by reference.

TECHNICAL FIELD

Embodiments of the present disclosure relate to processing systems, such as micro-controllers, having associated a program memory in which a firmware is stored.

BACKGROUND

FIG. 1 shows a typical electronic system, such as the electronic system of a vehicle, comprising a plurality of processing systems 10, such as embedded systems or integrated circuits, e.g., a FPGA (Field Programmable Gate Array), DSP (Digital Signal Processor) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a CAN (Controller Area Network) bus, and possibly a multimedia bus, such as a MOST (Media Oriented Systems Transport) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generation of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.). For example, complexity is expected to increase in particular in the context of the forthcoming Car2X and autonomous driving world, because safety and security of the processing systems 10 will become more and more relevant. Usually, safety is intended to guarantee the functionality in case of both random and systematic faults. Conversely, security is intended to guarantee the protection of the internal resources against malicious attacks.

However, the increase of complexity translates also into the need to update more frequently the firmware of the various processing systems 10, insofar as the possibility of bugs increases, existing features need to be improved (e.g., because of a new regulation or simply because an existing feature is not valid anymore), or new features/functions have to be added. Thus, also the update process of the firmware of the processing systems 10 should ensure both safety and security of the processing systems 10.

SUMMARY

Various embodiments of the present disclosure can provide solutions to permit an update of the firmware of a processing system.

As mentioned before, various embodiments of the present disclosure relate to a processing system.

In various embodiments, the processing system comprises a digital processing unit, and one or more non-volatile memories configured to store a firmware image to be executed by the digital processing unit. Specifically, in various embodiments, the one or more non-volatile memories comprise (at least) a first programmable memory area for storing a first updateable firmware image, a second programmable memory area for storing a second updateable firmware image and a third memory area for storing signature data. Accordingly, in various embodiments, the processing system may be configured to receive a firmware image via at least one communication interface, store the received firmware image either to the first or the second programmable memory area, and update the signature data.

In various embodiments, the processing system may thus be configured to execute the first firmware image or the second firmware image as a function of a firmware selection signal. For example, the processing system may comprise a memory controller configured to interface the digital processing unit with the one or more non-volatile memories. In this case, the memory controller may be configured to receive an address signal from the processing unit and generate a modified address signal for accessing the one or more non-volatile memories by performing an address translation operation as a function of the firmware selection signal.

In various embodiments, the processing system may thus comprise a signature search circuit configured to generate the firmware selection signal as a function of the signature data stored to the third memory area. Specifically, in various embodiments, the signature search circuit is configured to read the signature data and generate the firmware selection signal as a function of the signature data read.

For example, in various embodiments, the third memory area for storing signature data comprises a plurality of memory slots having the same number of bits, wherein respective signature data may be stored to each memory slot. Thus, the signature data may be written to the third memory area by storing respective signature data sequentially to the memory slots. In a complementary manner, the signature search circuit may sequentially read the memory slots in order to determine the last memory slot having stored valid signature data.

For example, each memory slot may be univocally associated with a respective programmable memory area for storing an updateable firmware image. In this case, the signature search circuit may determine the firmware selection signal as a function of the slot number of the last memory slot having stored valid signature data. Additionally or alternatively, the signature data written to each memory slot may directly comprise data identifying a respective programmable memory area for storing an updateable firmware image. In this case, the signature search circuit may generate the firmware selection signal as a function of the signature data written to the last memory slot having stored valid signature data.

In various embodiments, the processing system comprises also a diagnostic circuit configured to execute one or more self-test operations of the processing system in response to a diagnostic mode enable signal and a reset circuit configured to perform a complex reset of the processing system. Specifically, in response to a given event, such as a start-up of the processing system, the reset circuit generates a first reset of the processing system, wherein the processing system is configured to set the diagnostic mode enable signal in response to the first reset, thereby activating the executing of the one or more self-test operations. Once the one or more self-test operations have been executed, the reset circuit generates a second reset of the processing system. For example, in various embodiments, the reset circuit may generate a reset signal and a reset mode signal. Specifically, in response to the given event, the reset circuit may generate a reset trigger in the reset signal and set the reset mode signal to a first value, thereby indicating the first reset of the processing system. Conversely, once the one or more self-test operations have been executed, the reset circuit may generate a further reset trigger in the reset signal and set the reset mode signal to a second value, thereby indicating the second reset of the processing system.

In various embodiments, instead of reading and processing the signature data both for the first and the second reset, the signature search circuit is configured to read the signature data in response to the first reset, and generate, in response to the second reset, the firmware selection signal as a function of (at least) the signature data read in response to the first reset.

For example, in various embodiments, the signature search circuit may, in response to the first reset, store data identifying the slot number of the last memory slot having stored valid signature data to a first register and/or directly data identifying the selected programmable memory area/firmware image to a second register. In this case, the signature search circuit may thus generate the firmware selection signal as a function of the content of the first register. In various embodiments, the first and/or the second register is thus configured to maintain its value when a second reset occurs.

On one hand, this permits to reduce the time required to generate the firmware selection signal, because in this way the signature search circuit may be configured to not read sequentially all signature data for the second reset. On the other hand, this separation permits to introduce one or more additional verifications in order to verify the correct operation of the signature search circuit.

For example, in various embodiments, the signature search circuit may, in response to the second reset, read the content of the first register and verify whether the memory slot identified by the content of the first register is indeed the last memory slot having stored valid signature data. For example, the signature search circuit may verify whether the corresponding memory slot contains valid signature data, and whether the next memory slot contains indeed invalid signature data. For example, in case the memory slot identified by the content of the first register contains invalid signature data or the next memory slot contains valid signature data, the signature search circuit may generate an error signal.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
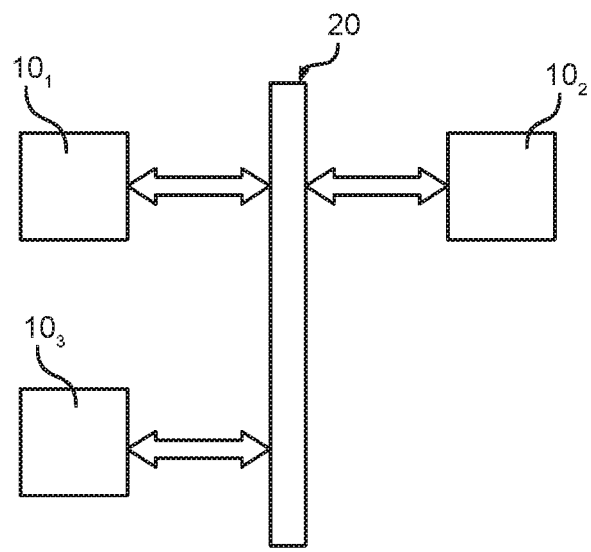
FIG. 1 shows a typical electronic system comprising at least one processing system.

In the following FIGS. 2 to 12 parts, elements or components which have already been described with reference to FIG. 1 are denoted by the same references previously used in such Figure; the description of such previously described elements will not be repeated in the following in order not to overburden the present detailed description.

Figure 2:
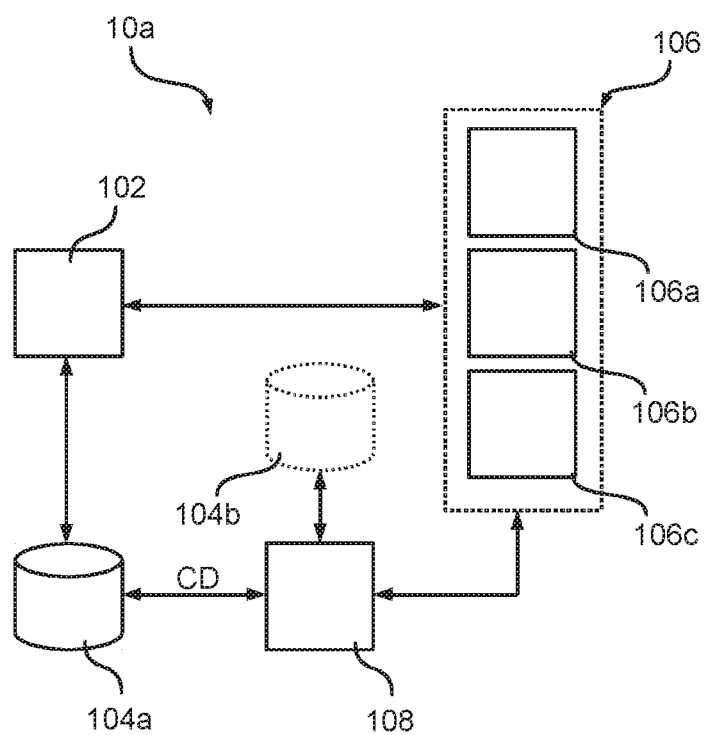
FIG. 2 shows an embodiment of a processing system comprising a processing unit and a non-volatile program memory for storing a firmware for the processing unit.

FIG. 2 shows a block diagram of an embodiment of a digital processing system 10a, such as a micro-controller.

In the embodiment considered, the processing system 10a comprises at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g., via the traces of a printed circuit board. Thus, in general the memory 104a contains the firmware for the processing unit 102, wherein the term firmware includes both the software of a micro-processor and the programming data of a programmable logic circuit, such as a FPGA.

In the embodiment considered, the processing unit 102 may have associated one or more resources 106, such as:

one or more communication interfaces, such as UART (Universal asynchronous receiver/transmitter), SPI (Serial Peripheral Interface Bus), I²C (Inter-Integrated Circuit), CAN bus (Controller Area Network), Ethernet, and/or debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Accordingly, the digital processing system 10a may support different functionalities. For example, the processing systems may have different hardware architectures. For example, the processing units 102 may have different architectures and processing speeds, and/or the number and type of the hardware resources 106 may vary. Moreover, the behavior of the processing unit 102 is determined by the firmware stored in the memory 104a, e.g., the software instructions to be executed by a microprocessor 102 of a micro-controller 10a. Thus, by installing a different firmware, the same hardware (micro-controller) can be used for different applications.

In various embodiments, the behavior of the processing system 10a may also be varied based on configuration data CD. For example, these configuration data CD may be written into specific areas of the non-volatile program memory 104a and retrieved when the processing system 10a is powered on. Alternatively or in addition, the configuration data CD may be stored in an additional non-volatile memory 104b, such as a one-time programmable (OTP) memory, e.g. implemented with fuses. For example, the program memory 104a may be used, in case the blocks shown in FIG. 2 are integrated in a common integrated circuit. Conversely, an additional non-volatile memory 104b may be used, in case the program memory 104a is an external memory, and only the other blocks are integrated in a common integrated circuit. Accordingly, in various embodiments, configuration data CD may be stored in a non-volatile memory (104a and/or 104b) of the integrated circuit comprising the blocks requiring configuration data, such as the processing unit 102 and/or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g. the micro-controller producer.

Moreover, the configuration data CD may also be used to customize the behavior of the hardware, e.g., the hardware resources 106, according to different application needs. For example, once the firmware of the processing system has been stored in the processing system 10a, some configuration data may be written in order to deactivate the debug interface, which e.g. could be used to download the firmware of the processing system 10a.

As mentioned before, various embodiments of the present application relate to solutions for updating the firmware stored in the program memory 104a.

Figure 3:
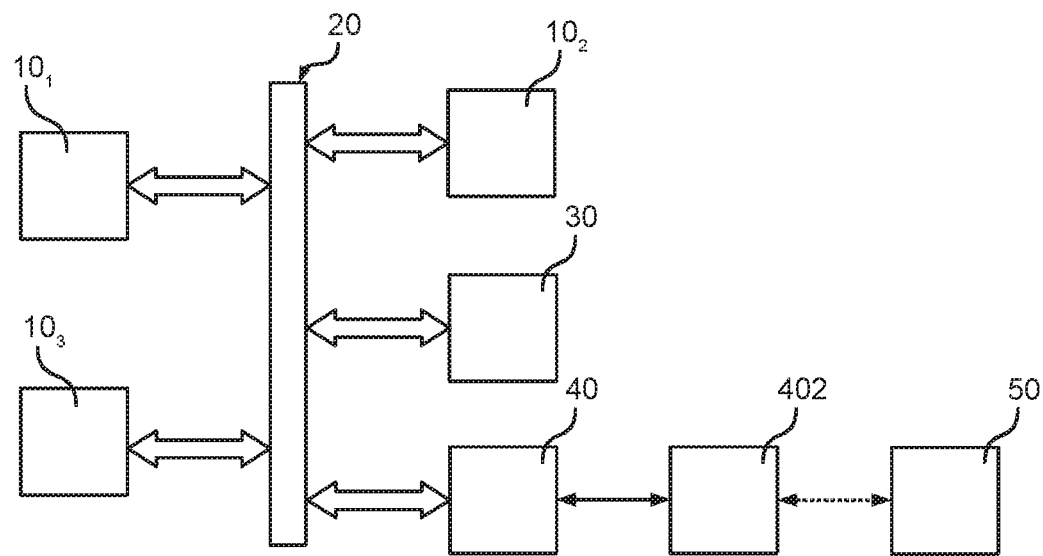
FIG. 3 shows an embodiment of an electronic system, wherein a new firmware may be provided to at least one processing system.

For example, as shown in FIG. 3, a given processing system 10 may receive a new firmware from a detachable program/diagnostic tool 30, usually used in a service center and/or from another processing system 40 of the system.

Generally, the program/diagnostic tool 30 and/or the processing system 40 may be connected to the processing system 10 to be updated in any suitable manner, e.g., via a dedicated communication channel, the communication system 20 used to exchange data between the processing systems 10, or another shared communication channel (not shown in the figures), e.g. used for system diagnosis.

For example, the processing system 40 may be configured to exchange data with one or more remote servers 50 via one or more wireless communication modules 402. For example, such a processing system 40 is often used to provide status and/or diagnostic information to the server 50. According, the processing system 40 may also receive the new firmware for a given processing system 10 via the communication interface 402 from a remote server 50. For example, the communication interface 402 and the remote server(s) 50 may exchange data via Internet.

For example, in various embodiments, the communication module 402 may comprise a transceiver for a mobile communication network, such as a GSM (Global System for Mobile Communications) transceiver, a CDMA (Code Division Multiple Access) transceiver, a W-CDMA (Wideband Code Division Multiple Access) transceiver, a UMTS (Universal Mobile Telecommunications System) transceiver, an HSPA (High-Speed Packet Access) transceiver, and/or an LTE (Long-Term Evolution) transceiver, wherein communication with the one or more servers 50 is exchanged via a base station. Alternately, or in addition, the communication module 402 may comprise a Wi-Fi interface according to (one or more of the versions of) the IEEE 802.11 standard.

For example, the use of the processing system 40, essentially representing a firmware distribution/update module, has the advantage that the software of one or more of the processing systems 10 may be updated without the need to bring the vehicle to a service center. On the one hand, such a solution is economically more convenient for the car vendors. On the other side, the solution is also more comfortable for the vehicle owner, because it saves the time to bring the car to the service center.

Generally, the communication module 402 may also be connected to or integrated in the processing system 10 to be updated. For example, this may be suitable, when the system comprises only a single processing system 10 to be updated.

Those of skill in the art will appreciate that for such a wireless update process is usually used the term "over-the-air" (OTA) programming. Such OTA update procedures are conventionally known, e.g., in the contexts of mobile communication standards. However, when applied to the update of processing systems 10 used in automotive applications, more stringent requirements in terms of availability, safety, and security are usually required.

For example, in various embodiments, in order to suitably handle the availability requirement, the processing system 10a is configured to store both the old and the new firmware image, i.e., both the old and the new firmware are stored contemporarily (at least temporarily) at different memory areas of the program memory 104a. For example, in this way, if an error occurs during the update process and/or during the execution of the new firmware, the processing system 10a may revert back to the old firmware version. This implies that the processing system 10a has to decide whether to use the new or the old firmware. The fact that a decision has to be made implies safety and security concerns in order to evaluate whether the correct decision was made. For this reason, the decision should respect some kind of robustness criteria in order to avoid unwanted faults, which could also derive from security attacks.

In addition to availability, security and safety requirements, further requirements may be relevant. For example, such further requirements may stem from software management and market segment management.

For example, in various embodiments, the processing system 10a is configured to provide a consistent address range independently from which firmware image is executed, which as mentioned before may indeed be stored at different memory locations. Thus, notwithstanding which firmware image is used (old or new), the hardware resources are addressable by the firmware via the same addresses. For example, if the firmware reads some data from the non-volatile memory at a given address, this address remains always the same (i.e. consistent) independently from which firmware image is executed.

In various embodiments, the processing system 10a is configured to permit a selective activation/deactivation of the disclosed update procedure. Specifically, insofar as the processing system 10 may be used in different applications, the firmware update procedure may be an optional feature, and the producer of the processing system and/or the firmware developer should be able to enable or disable it.

Figure 4:
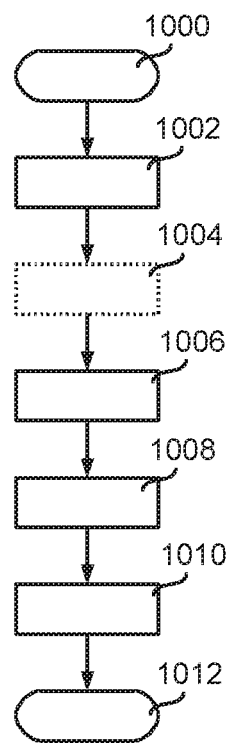
FIG. 4 shows an embodiment of a process implemented in a processing system in order to update its firmware.

FIG. 4 shows an embodiment of an update procedure in accordance with the present disclosure. Specifically, in the embodiment considered, the update procedure may be activated once the product incorporating the processing system 10a has been delivered. The update procedure may be handled by a dedicated hardware resource of the processing system and/or by a suitable programming of the processing unit 102. For example, when a dedicated hardware resource is used for the update process, the processing unit 102 may also be switched off during the update procedure.

Conversely, when the processing unit 102 is used, the processing unit 102 execute a given firmware containing also the update function. Generally, this firmware may be directly the old firmware of the processing system 10a, i.e., the old firmware contains instructions for implementing the update procedure. Alternatively or in addition, the update function may be implemented in a separate firmware image, such as a separate system firmware. For example, once having received an update request, the processing system 10a may activate such a separate firmware image in order to handle the update request.

After a start step 1000, the processing system 10a receives at a step 1002 a new firmware via a communication interface of the processing systems 10a and stores at a step 1006 the firmware received to the program memory 104a of the processing system. The communication interface (essentially representing a resource 106 of the processing system 10a) may be any communication interfaces of the processing system 10a, such as a CAN bus or Ethernet communication interface (see also the description of FIGS. 2 and 3).

Specifically, in various embodiments, the program memory 104a is split into a plurality of updateable firmware memory areas, wherein a respective firmware image may be stored in each updateable firmware memory area at the step 1006. For example, in various embodiments, the program memory 104a is split into two updateable firmware memory areas and accordingly two firmware images/versions FWA and FWB (received at the step 1002) may be stored. However, also more updateable firmware memory areas, such as four, may be used. In various embodiments, the old firmware (currently used by the processing system 10a) is thus stored in a first memory area, and the processing systems 10a is configured to store the new firmware received in a second memory area, i.e. without overwriting the old firmware. Accordingly, once having received the new firmware, the memory 104a contains in a first memory area the old firmware and in a second memory area the new firmware. Generally, the memory 104a may also comprise one or more further memory area, e.g., for storing firmware images which may not be updated via the update procedure, such as a system firmware used for the update procedure and/or a factory default firmware.

Generally, the program memory 104a may also be implemented with a plurality of physical memories. For example, in various embodiments, each memory area used to store a respective updateable firmware may be implemented with a respective physical memory.

In various embodiments, the step 1006 may also involve verifying whether the new firmware has been correctly stored to the memory 104a. For example, for this purpose, the processing system 10a may verify whether the complete firmware may be read-back from the memory 104a. Alternatively or additionally, the processing system 10a may temporality store (e.g. in a RAM of the processing system 10a) a portion of the firmware received, write the portion of the firmware to the memory 104a, read the same portion from the memory 104a and verify whether the portion read corresponds to the portion temporality stored.

In various embodiments, before or after storing the firmware to the memory 104a, the processing system 10a may validate at a step 1004 the firmware received. For example, in various embodiments the processing system 10a is configured to receive an encrypted version of the firmware. In this case, the processing system 10a may validate the firmware by verifying whether (at least part of) the firmware received may be decrypted. Moreover, when transmitting an encrypted version of the firmware, the processing system 10a may either store the decrypted or encrypted version into the memory 104a. For example, the encrypted version may be stored when the memory controller of the memory 104a supports also a real-time decryption operating of the firmware read from the program memory 104a.

Alternatively or additionally, the firmware received may comprise a digital signature calculated as a function of the respective firmware data, e.g., calculated via a hash function, such as MD5 or one of the Secure Hash Algorithms (SHA). Accordingly, in this case, the processing system 10a may validate the firmware by recalculating the signature and verify whether the signature calculated corresponds to the signature received.

Once the firmware has been stored to the program memory 104a and optionally be verified and/or validated, the processing system 10a stores at a step 1008 data OTA_SIG to a non-volatile memory in order to indicate, which updateable firmware image should be used. Generally, this memory may be any non-volatile memory of the processing system 10a, including the program memory 104a, the optional memory 104b for the configuration data CD, or even a further non-volatile memory.

Next, in response to a certain event (e.g. a reset), at a step 1010 the processing system 10a reads the data OTA_SIG, decides (as a function of the data OTA_SIG) which updateable firmware image should be used and executes the respective firmware image.

Finally, the update procedure terminates at a stop step 1012.

Figure 5:
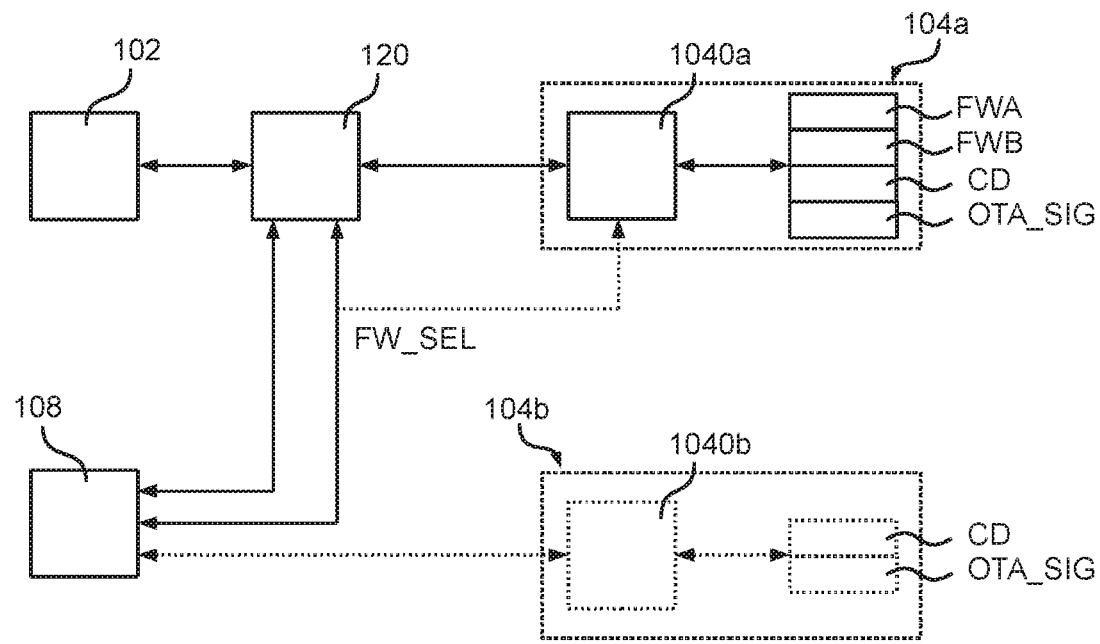
FIG. 5 shows a first embodiment of a processing system supporting plural updateable firmware images, wherein the firmware selection is performed based on signature data and optional configuration data.

As mentioned before, the part of the update procedure used to store the new firmware to the program memory 104*a* and for storing the signature data OTA_SIG, i.e. steps 1002-1008 of FIG. 4, may be handled by a separate hardware module of the processing system 10*a* and/or by a suitable programming of the processing unit 102. Conversely, FIG. 5 shows an embodiment of the hardware architecture of a processing system 10*a* in accordance with the present disclosure used to implement the step 1010.

Generally, the processing unit 102 of the processing system 10*a* has associated a program memory 104*a*. Specifically, in various embodiments, the program memory 104*a* comprises a memory controller 1040*a* configured to handle read (and possibly also write) accesses to one or more physical memory areas of the program memory 104*a*. Moreover, the processing system 10*a* comprises a memory controller 120 configured to handle the data exchange between the processing unit 102 and the memory controller 1040*a*. The memory controller 120 may be integrated directly in the processing unit 102 or may be connected to the processing unit 102 via a bus system of the processing system 10*a*; the latter being preferable when a plurality of different circuits of the processing system 10*a* should be able to directly access the program memory 104*a*.

The basic operation of such memory controllers 120 and 1040*a* is per se well known in the art. For example, in order to perform a read operation, the controller 120 may be configured to generate an address signal and the controller 1040*a* may provide a data signal containing the data read from the memory location indicated by the address signal. Generally, any parallel or serial communication may be used for the data exchange between the circuits 120 and 1040*a*.

As mentioned before, the physical memory area of the program memory 104*a* is organized in a plurality of updateable firmware memory areas, e.g. FWA and FWB, wherein in each memory area may be stored a firmware (steps 1002-1008 described with respect to FIG. 4) and the firmware selection should be transparent for the processing unit 102, thereby providing a consistent address range for the processing unit 102.

According to various embodiments of the present disclosure, the selection of the firmware to be executed is thus made directly by the memory controller 120 or the memory controller 1040*a* as a function of a firmware selection signal FW_SEL. For example, in various embodiments, the memory controller 120 may vary the address signal provided to the memory controller 1040*a* as a function of the firmware selection signal FS_SEL, thereby selecting a given memory area in the program memory 104*a*. Alternatively, the memory controller 1040*a* may select directly a given physical memory area within the program memory 104*a* as a function of the firmware selection signal FW_SEL.

For example, in various embodiments, the firmware selection signal FW_SEL may corresponds to further bits of the address signal used to access the physical memory area of the program memory 104*a*, wherein the additional bits may be added either by the memory controller 120 or the memory controller 1040*a*. For example, in various embodiments, the memory controller 120 is configured to add the firmware selection signal FW_SEL as the most significant bits of the address signal. Preferably the firmware selection via the signal FW_SEL is implemented in the memory controller 120, because in this way one or more conventional non-volatile memories (each comprising a respective memory controller 1040*a*) may be used to implement the program memory 104*a*.

For example, assuming a program memory having 2 Mbytes, split into two images each having 1 Mbytes, the memory controller (120 or 1040*a*) may just change the bit 36 of the address signal, because the "lower" 1 Mbyte image is "physically" mapped at address 0x0, whereas the "higher" 1 Mbytes memory spaces is "physically" mapped at address 0x10000. In this case, the processing unit 102 may only access a virtual address range of 1 Mbytes, which starts always at the address 0x0, and by adding an initial bit having the logic value "0" or "1" the memory controller may map the requests either to the lower or the upper 1 Mbytes firmware memory area.

In various embodiments, the memory controller 120 or the memory controller 1040*a* may, however, perform a complete address translation operation in order to map a given virtual address provided by the processing unit 102 to a respective physical address associated with a given memory location in the program memory 104*a*. For example, the memory controller 120 may generate the address signal by adding a given offset to the address provided by the processing unit 102, wherein the offset is determined as a function of the firmware selection signal FW_SEL. Specifically, in various embodiments, the offset corresponds to the memory start address of the selected firmware image.

As mentioned before, the processing system 10*a* comprises also a non-volatile memory, in which the signature data OTA_SIG are stored. For example, in the embodiment considered, the signature data OTA_SIG are stored in the non-volatile program memory 104*a*. As schematically shown in FIG. 5, the signature data OTA_SIG may also be stored in a further non-volatile memory, such as an additional non-volatile memory 104*b*, in which additional configuration data CD of the processing system 10*a* may be stored. Generally, as described with respect to FIG. 2, the configuration data CD may also be stored in the program memory 104*a*. Preferably, the signature data OTA_SIG and the configuration data CD are stored to a non-volatile memory being integrated in the integrated circuit comprising the processing unit 102. Conversely, the program memory 104*a* may also be an external memory.

In the embodiment considered, the processing system 10*a* comprises also a hardware circuit configured to read the signature data OTA_SIG and generate the firmware selection signal FW_SEL as a function of the signature data OTA_SIG.

Specifically, in the embodiment considered, this operation is implemented in the configuration module 108 described with respect to FIG. 2, i.e. the decision which firmware should be executed may be made by the configuration module 108, which is also configured to read the configuration data CD and distribute the configuration data CD within the processing system 10*a*.

This decision step may be critical, because an eventual malfunction may compromise the overall system functionality, such as the functionality of an engine control unit and, as a consequence, the car functionality itself, which can generate hazardous situations for the driver and passengers. Similarly, once the decision is made, the way the module 108 propagates the signal FW_SEL to the system may also be critical.

Figure 6:
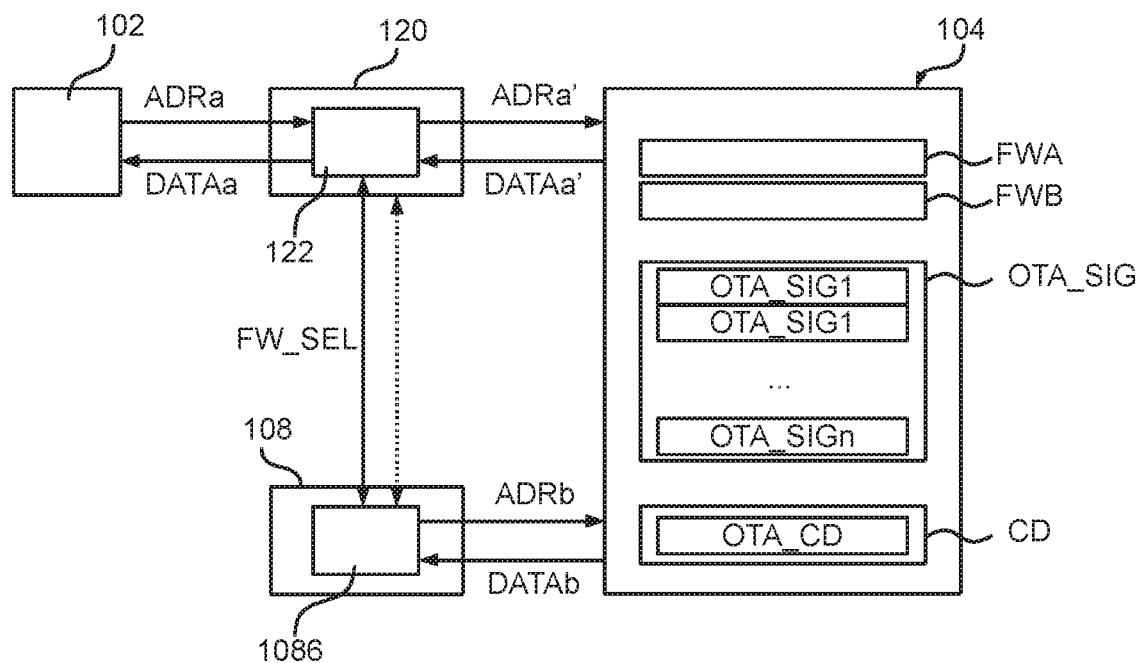
FIG. 6 shows a second embodiment of a processing system supporting plural updateable firmware images, wherein the firmware selection is performed based on signature data and optional configuration data.

FIG. 6 shows a possible implementation of the organization of the signature data OTA_SIG.

Generally, as mentioned before, the various updateable firmware images FWA, FWB, the signature data OTA_SIG and the optional configuration data CD are stored to one or more non-volatile memories, which are identified in FIG. 6 generally with the reference signal 104. For example, in the embodiment considered, two memory areas in the memory 104 are used to store a firmware FWA and a firmware FWB.

In the embodiment considered, the configuration module 108 is used to read both the configuration data CD and the signature data OTA_SIG, and generate a firmware selection signal FW_SEL.

For example, in the embodiment considered, the firmware selection signal FW_SEL is provided to the memory controller 120, which comprises a hardware circuit 122, such as a combinational logic circuit, which performs the address translation operation as a function of the firmware selection signal FW_SEL. For example, in the embodiment considered, the circuit 122 receives an address signal ADRa from the processing unit 102 and generates a modified address signal ADRa' used to access the memory 104. In response to the read request to the address ADRa' the memory 104 provides a data signal DATAa' containing the respective data read from the memory 104, which the memory controller 120 forwards via a data signal DATAa to the processing unit 102. Generally, any suitable communication may be used for the communication between the processing unit 102 and the memory controller 120, and the memory controller 120 and the memory 104.

As mentioned before, the configuration module 108 is configured to determine the firmware selection signal FW_SEL as a function of the signature data OTA_SIG stored at a given memory area. Specifically, in the embodiment considered, the signature data OTA_SIG are stored to a dedicated/reserved memory area having a given dimension, i.e. the processing system 10a is configured to store the data OTA_SIG to a reserved signature memory area (step 1006 of FIG. 4).

Specifically, in various embodiments, this memory area is split into a plurality of memory locations/slots having the same number of bits, i.e. the data OTA_SIG comprise a given number of slots OTA_SIG1, OTA_SIG2, ... OTA_SIGn, wherein each slot has the same number of bits. Generally, a single bit could be used for each slot OTA_SIG1, OTA_SIG2, ... OTA_SIGn. However, in order to render the solution more robust, each slot may comprise a plurality of bits, e.g., between 1 and 32 bytes, e.g. 2, 4, 8 or 16 bytes. The solution adopted allows thus that a given maximum number of signatures n may be written to the memory area OTA_SIG, which can be calculated from the dimension of the memory area OTA_SIG divided by the signature length/number of bits of each slot. For example, in various embodiments, the memory area OTA_SIG has a dimension of 16 Kbytes and the signature length is 16 bytes, thereby permitting to store n=1000 slots.

Generally, the start address of the memory area OTA_SIG and/or the maximum number n of signature slots OTA_SIG1, OTA_SIG2, ... OTA_SIGn may be fixed (e.g. at the design time) or programmable, e.g. by the producer of the processing system or a software developer. For example, the start address of the memory area OTA_SIG and/or the maximum number n of signature slots OTA_SIG1, OTA_SIG2, ... OTA_SIGn may be programmable by storing respective data together with the configuration data CD of the processing system.

In various embodiments, each slot OTA_SIG1, OTA_SIG2, ... OTA_SIGn is associated univocally with a given firmware memory area. For example, in case only two firmware memory areas FWA and FWB are used, each odd slot OTA_SIG1, OTA_SIG3, etc. may be associated with the first firmware memory area FWA and each even slot OTA_SIG2, OTA_SIG4, etc. may be associated with the second firmware memory area FWB. This principle may also be applied by increasing the number of firmware memory areas, essentially by implementing a modulo operation, e.g. (mod 2) for two areas, (mod 4) for four areas, etc.

Specifically, in various embodiments, the signature memory area OTA_SIG is empty when no firmware is stored to the memory 104a, i.e. all slots OTA_SIG1 ... OTASIGn are unprogrammed.

For example, when the processing system 10a receives a first firmware, the processing system 10a stores this firmware to the first updateable firmware memory area FWA (step 1006). Next, e.g., once having verified/validated the new firmware, the processing system 10a writes a first signature to the first memory location OTA_SIG1 in the signature memory area OTA_SIG, thereby indicating that the first firmware memory area contains a valid firmware (step 1008).

Instead, when the processing system 10a receives a second firmware, the processing system 10a stores this firmware to the second updateable firmware memory area FWB. Next, e.g., once having verified/validated the new firmware, the processing system 10a writes a second signature to the second memory location OTA_SIG2 in the signature memory area OTA_SIG, thereby indicating that the second firmware memory area contains a valid firmware.

The same operation may be performed for further firmware images, by alternating the firmware memory areas (or "looping" through the firmware areas, in case more than two firmware memory areas are supported), and sequentially increasing the slot number in the memory area OTA_SIG, i.e. the slots OTA_SIG1, OTA_SIG2, ... OTA_SIGn are written sequentially by storing a given (fixed or variable) signature to the slot following the last written slot.

Accordingly, a signature search module 1086 of the configuration module 108 may read the signature data OTA_SIG in order to determine the last slot written, determine the associated firmware image associated with this slot and set the firmware selection signal FW_SEL accordingly. For example, this is schematically shown in FIG. 6, wherein the signature search circuit 1086 provides an address signal ADRb to the memory 104 containing the signature data OTA_SIG and the memory 104 returns a data signal DATAb comprising the respective data read. Generally, in case a single memory 104 is used, the configuration module 108 may indeed access the memory 104 through the memory controller 120, or a dual-port memory may be used.

The signature value stored to the slots OTA_SIG1, OTA_SIG2, ... OTA_SIGn is not particularly relevant. For example, the same (e.g. hardwired) signature value may be used for all slots. Conversely, in various embodiments, the signature value stored to a given slot OTA_SIG1 ... OTA_SIGn may be determined as a function of the slot number. For example, in various embodiments, the signature value for a given slot OTA_SIG1 ... OTA_SIGn is obtained by encrypting the slot number (or a value indicative thereof) with a cipher key or by using a hashing function. Thus, in this way, the signature search circuit 1086 may also determine whether a signature stored to a given slot number is correct, thereby avoiding possible security attacks.

Accordingly, in the previous embodiments, the firmware memory area to be used is specified implicitly via the slot index of the last correctly written slot OTA_SIG1, ... OTA_SIGn. Alternatively, the signature written to a given slot may also contain data for associating the signature explicitly with a respective firmware memory area, such as an index. For example, this may be useful, when more than two firmware memory areas are supported, and the firmware memory areas are not necessarily written sequentially as described in the foregoing. For example, in various embodiments four firmware memory areas are supported, wherein the first firmware area could be used to store a system firmware, the second firmware area could be used for a factory default firmware (e.g. the version provided when the car is sold) and the third and fourth firmware areas could be used for storing alternatively new firmware images. Additionally or alternatively, the update request could also contain directly the index of the firmware memory area to which the new firmware should be written, whereby this index is inserted into the signature written to the area OTA_SIG.

FIG. 6 also shows that the signature search module 1086 may have associated configuration data OTA_CD used to configure the firmware update procedure. For example, in various embodiments, the configuration data OTA_CD are stored together with the other configuration data CD.

For example, such configuration data OTA_CD may consist in a sequence of bits, wherein a respective sub-set of bits is used to specify e.g., whether the update feature is enabled, optional data identifying the position of the memory area OTA_SIG, such as the start address (and possible the dimension) or only an index of a plurality of pre-assigned memory areas, or optionally the number of updateable firmware memory areas and/or optionally their start-address in the program memory 104a.

For example, in various embodiments, the position of the memory area OTA_SIG is specified via an index, e.g., represented by two bits, wherein with each of the four possible indices is associated a respective hardwired start-address for the memory area OTA_SIG.

In various embodiments, indeed the update feature is enabled only when two sets of configuration data are written. The first set is only programmable by the producer of the processing system 10a, thereby specifying whether the firmware developer may use the update feature. The second set is programmable by the firmware developer in order to specify whether the update feature should indeed be activated.

Figure 7:
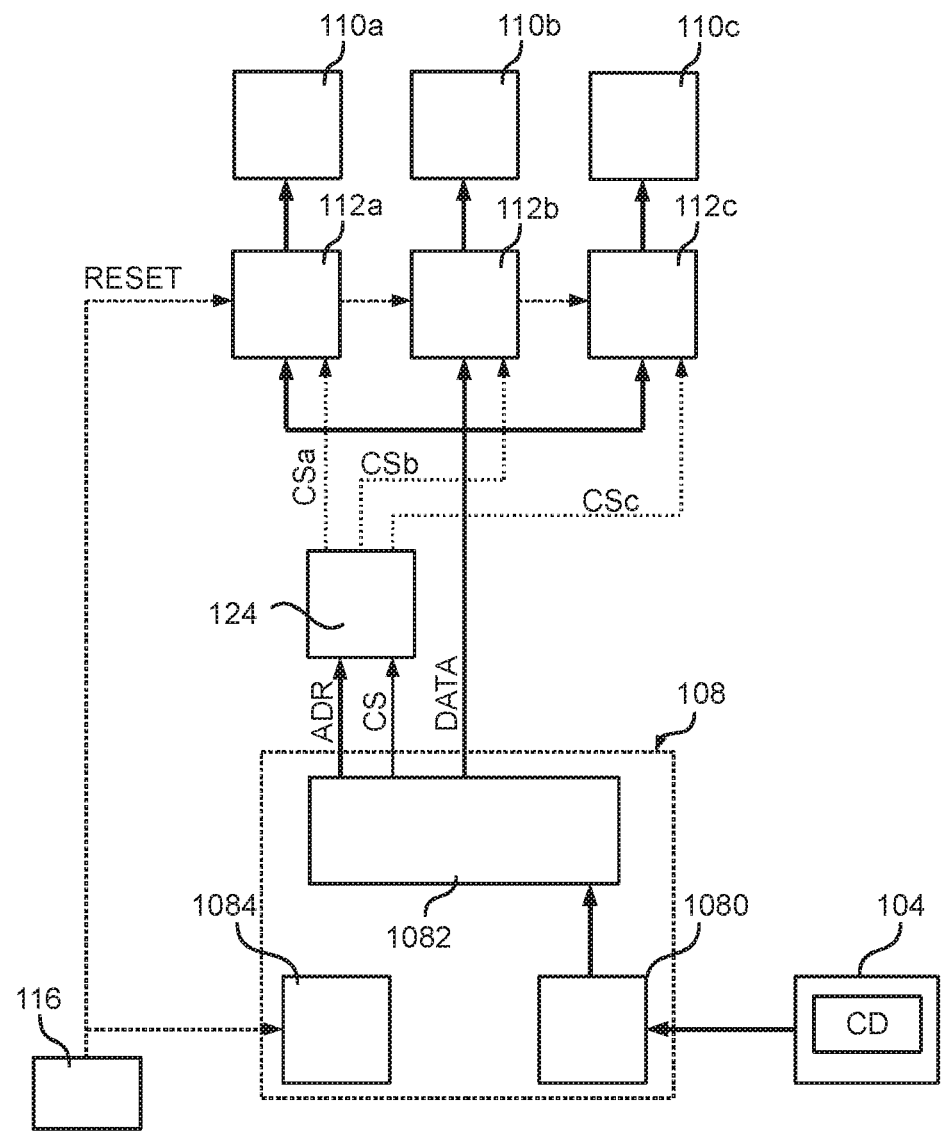
FIG. 7 shows an embodiment of a processing system comprising a configuration module and configuration data clients.

FIG. 7 shows in this respect a possible embodiment for distributing the configuration data CD.

In the embodiment considered, one or more configuration data CD are stored in one or more non-volatile memories 104 (i.e., memories 104a and/or 104b). In various embodiments, these configuration data CD are stored in reserved memory areas, e.g. in the form of a plurality of consecutive memory locations.

In the embodiment considered, the processing system 10a comprises a configuration module 108 configured to read the configuration data CD from the one or more non-volatile memories 104 and a plurality of configuration data clients 112 configured to receive respective configuration data from the module 108 and distribute them among a plurality of hardware blocks 110 requiring configuration data. For example, in the embodiment considered, the processing system 10a comprises three configuration data clients 112a, 112b and 112c and the hardware blocks 110.

Generally, the hardware blocks 110 may correspond to any block of the processing system 10a requiring configuration data and may correspond to the processing unit 102, a hardware resource 106, or even a memory (e.g. the memory 104a). Generally, each configuration data client 112 may be associated univocally with a single hardware block, and provide configuration data only to the associated hardware block, e.g. a specific hardware resource 106, or may be associated with a plurality of hardware blocks, e.g. a plurality of hardware resource 106. In general, the configuration data client 112 may also be integrated in the respective hardware block.

In the embodiment considered, the configuration module 108 comprises thus a data read module 1080 configured to read the configuration data CD from the memory 104 and a dispatch module 1082 configured to transmit the configuration data to the configuration data clients 112. The configuration data client 112 is configured to receive the configuration data from the module 108, store them into the internal register, e.g., store them into one or more internal flip-flops or latches. The data stored in the register may then be used to generate one or more signals, which influence the behavior of one or more hardware blocks 110.

Generally, any communication may be used for transmitting the configuration data to the configuration data client 112, including both serial and parallel communications. For example, the configuration module 108 and the configuration data clients 112 may be connected via a bus, and each configuration data clients 112 may have associated a respective target address.

For example, in various embodiments, the communication between the dispatch module 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may consist in 16 or 32 bits, wherein a given number of bits specifies the address of one of the configuration data clients 112, and the payload may consist in 16 or 32 bits.

For example, in various embodiments, the data read module 1080 is configured to read (e.g., via the signals ADRb and DATAb, or the memory controller 120 described with respect to FIG. 6) blocks of 64 bits from the memory 104, wherein the first 32 bits contain the data attributes (including the address of a configuration data client) and the second 32 bits contain the configuration data to be transmitted to the address specified in the data attributes. In this way, insofar as the configuration data CD are stored in the non-volatile memory 104 directly in the form of data packets/DCF frames, the dispatch module 1082 may simply forward the payload to the corresponding configuration data client 112 indicated in the attribute field of the data packet/DCF frame.

As described before, each configuration data client/DCF client 112 may be a hardware module, usually comprising a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110. For example, as mentioned before, each configuration data client 112 may have associated a univocal address (i.e., univocal within each processing system 10a) and analyses the data transmitted by the dispatch module 1082 in order to determine whether the additional data attributes (DCF Format attributes) contain the address associated with the configuration data client 112.

In various embodiments, the module 108 may also comprises a state control module 1084 configured to manage the various configuration phases of the processing system 10a.

For example, in various embodiments, once the processing system 10a is switched-on, a reset module 116 of the processing system 10a may generate a reset signal RESET, which is used to perform a reset of the various components of the processing system 10a. For example, the reset signal RESET may correspond to a reset pulse of a given number of clock cycles, provided to the blocks 110 of the processing system 10a. For example, in the embodiment considered, the reset signal RESET may be used by the configuration data clients 112 in order to set the internal register to a given reset value.

Similarly, in response to a reset, the state control module 1084 may activate the configuration phase. Specifically, during the configuration phase, the data read module 1080 may read the configuration data CD from the memory 104 and the dispatch module 1082 may send the configuration data CD to the various configuration data clients 112, thereby overwriting the reset values.

For example, in the embodiment considered, the dispatch module 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch module 1082 generates also an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder 124 configured to activate one of the configuration data clients 112 as a function of the address signal ADD. For example, in the embodiment considered, the decoder 124 may set a chip select signal CSa in order to indicate that the configuration data client 112a should read the data signal DATA when the address signal ADR corresponds to an address assigned to the configuration data client 112a (and the chip select signal CS is set). Similarly, the decoder 124 may set a chip select signal CSb in order to indicate that the configuration data client 112b should read the data signal DATA when the address signal ADR corresponds to an address assigned to the configuration data client 112b (and the chip select signal CS is set), etc.

Figure 8:
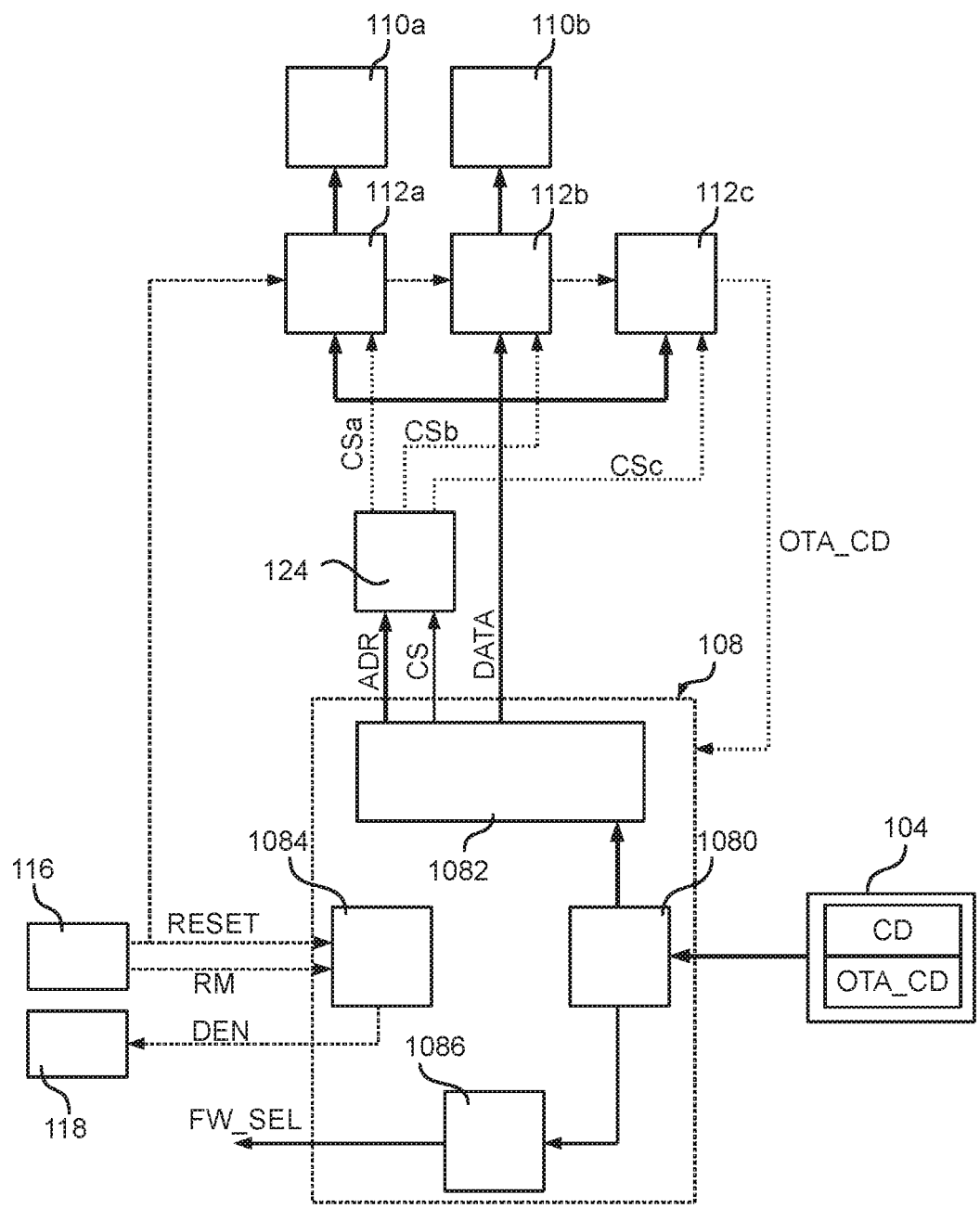
FIG. 8 shows an embodiment of a processing system comprising a configuration module used to read the configuration data and/or signature data of FIG. 5 or 6 in response to a reset generated by a reset module.

FIG. 8 shows a modified embodiment of the configuration module 108 comprising also the signature search circuit 1086 described in the foregoing.

Specifically, in the embodiment considered, the signature search module 1086 is configured to use the data read module 1080 in order to read the signature data OTA_SIG from the memory 104. Specifically, in various embodiments, the signature search module 1086 reads the signature data OTA_SIG once the state control module 1084 determines (and signals to the module 1086) that all configuration data CD have been read from the memory 104.

Accordingly, the signature search module 1086 accesses sequentially the memory 104 in order to read the content of the slots OTA_SIG1 ... OTA_SIGn. In various embodiments, the signature search module 1086 continues to read the signature data OTA_SIG only until an empty slot OTA_SIG1 ... OTA_SIGn is detected. Next, the signature search module 1086 determines the firmware selection signal FW_SEL as a function of the signature data read, e.g. by determining the last slot OTA_SIG1 ... OTA_SIGn having stored a valid signature.

As described in the foregoing, the signature search module 1086 may use configuration data OTA_CD for this purpose. Generally, the data read circuit 1080 may forward the configuration data OTA_CD directly to the signature search circuit 1086.

Conversely, in the embodiment considered, the configuration module 108 itself has associated a configuration data client 112c and the update configuration data OTA_CD are included in the configuration data CD. Accordingly, during the configuration phase, the configuration circuit 108 (via the data read circuit 1080 and the dispatch circuit 1082) will also read the configuration data OTA_CD and transmit the configuration data OTA_CD to the configuration data client 112c associated with the configuration module 108. Accordingly, once the configuration phase ends and the signature search module 1086 is activated, the signature search module 1086 may perform the described operations as a function of the configuration data OTA_CD provided by the configuration data client 112c associated with the configuration module 108. In the embodiment considered, the signature search is executed after the configuration phase, because the configuration data OTA_CD may also contain data required to correctly execute the signature search operation. However, in case this information is fixed, e.g. hardwired, the signature search may also be executed before the configuration phase.

In the embodiment considered, the signature search module 1086 is thus activated once the state control module 1084 signals the end of the configuration phase (distribution of the configuration data CD), wherein the state control module starts the configuration phase in response to the reset signal RESET.

The inventor has observed that indeed two types of resets may be used in conventional processing systems. The first reset corresponds to a "simple" reset as described essentially in the foregoing, where some kind of reset event activates the internal reset stage 116 in order to perform a functional reset of the processing system. The second type of reset corresponds to a complex reset wherein the reset is split into a plurality of phases.

Figure 9:
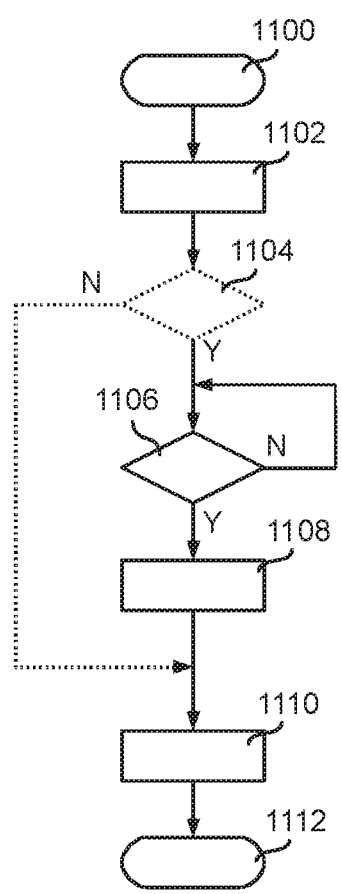
FIG. 9 shows an embodiment of the reset module of FIG. 8.

FIG. 9 schematically shows a possible implementation of a complex reset.

At a step 1100 the complex reset is activated and a first reset is performed at a step 1102. For example, the reset module 116 may set the signal RESET at the step 1104. Accordingly, in response to the reset requested at the step 1102, the various latches/registers of the processing system 10a are reset (e.g., the content of the configuration data clients 112) and the configuration module 108 reads and distributes the configuration data CD.

In the embodiment considered, the processing system may then execute one or more system diagnostic operations, i.e. the processing system 10a executes a Built-In Self-Test (BIST). Generally, the BIST operation may be executed by a dedicated diagnostic hardware circuit of the processing system 10a and/or by executing a system diagnostic firmware with the processing unit 102. As mentioned before, such a diagnostic system firmware may also comprise instructions in order to handle the update process. Accordingly, the diagnostic hardware circuit may be activated and/or the system firmware may be started at the end of the step 1102. For example, in the embodiment shown in FIG. 8, the processing system 10a comprise a diagnostic circuit 118, which is activated by the state control circuit 1084 via an enable signal DEN. For example, the state control module may set the signal DEN once the configuration phase and signature search phase has been completed.

Next, the reset module 116 waits at a step 1106 until the diagnostic operations have been executed, i.e. the self-test has been completed. For example, this is schematically shown in FIG. 9 via a verification step 1106 wherein the reset module 116 returns to the step 1106 when the self-test has not been terminated (output "N" of the verification step 1106). Conversely, when the self-test has been terminated (output "Y" of the verification step 1106), the reset module 116 proceeds to a step 1108.

Specifically, due to the fact that the self-test operation may also test one or more registers of the processing system 10a, which usually involves write and/or read operations, the content of such registers may be modified, for example the configuration data stored by the configuration data clients 112 may be modified. Accordingly, when having executed a self-test, it is preferable to execute a second reset at the step 1108. For example, the reset module 116 may again set the signal RESET at the step 1108. However, in this case, the state control module does not activate anymore the diagnostic operation. For example, in the embodiment shown in FIG. 8, the reset module 116 provides a reset type signal RM to the state control module and the state control module 1086 activates the diagnostic mode (e.g., the circuit 118 via the signal DEN) when the signal RM has a first value indicative of the first reset of a complex reset (step 1102) and the state control module 1086 does not activates the diagnostic mode when the signal RM has a second value indicative of the second reset of a complex reset (step 1108).

Accordingly, in response to the reset requested at the step 1108, the various latches/registers of the processing system 10a are reset (e.g. the content of the configuration data clients 112) and the configuration module 108 reads and distributes again the configuration data CD.

Next, the normal operation mode of the processing system 10a is started at a step 1110 and the reset procedure terminates at a step 1112. For example, the state control circuit 1086 may activate the normal operation mode at the end of the configuration phase and the signature search phase when the signal RM has the second value indicative of the second reset (step 1108).

FIG. 9 also shows an optional verification step 1104 between the steps 1102 and 1106. Specifically, this step represents a verification step used to selectively enable or disable the self-test. As mentioned before, the configuration data CD are already distributed in response to the rest at the step 1102. Accordingly, the configuration data CD may also include data which indicate whether the self-test function should be activated or not, possibly also including data specifying which self-test should be executed.

Accordingly, in the embodiment considered, when the execution of the self-test is enabled (output "Y" of the verification step 1104), the reset module 116 proceeds to the step 1106. Conversely, when the execution of the self-test is disabled (output "N" of the verification step 1104), the procedure may directly proceed to the step 1110 in order to start the normal-operation mode of the processing system. For example, in this case, the state control circuit 1086 may activate the normal operation mode at the end of the configuration phase and the signature search phase when the signal RM has the first value indicative of the first reset of a complex reset (step 1102) and the self-test is disabled.

Conversely, a simple reset essentially implements only the steps 1102 and 1110, i.e. the reset 1102 is executed always and the additional steps 1104-1108 are only executed for a complex reset. For example, when the processing system 10a supports only a simple reset, the reset mode signal RM may be omitted and the state control circuit 1086 may activate the normal operation mode at the end of the configuration phase and the signature search phase. Conversely, when the processing system 10a supports both a complex and a simple reset (which may be selected in some suitable manner), the state control circuit 1086 may activate the normal operation mode at the end of the configuration phase and the signature search phase also when the signal RM has the third value indicative of a simple reset.

Accordingly, when executing a simple reset, a single reset is performed and the configuration data CD are read only one time, whereas when executing a complex reset, two resets are performed and the configuration data CD are read two times.

The implementation of a simple or complex reset may be determined by the hardware of the processing system 10a, e.g. because the processing system 10a does not support a self-test function. However, for automotive applications a self-test function is almost mandatory in order to be able to test the circuits of the processing system ma. Generally, as mentioned before, the processing system 10a may also support both types of resets, wherein a complex reset is executed in response to a first set of events and a simple reset is executed in response to a second set of events. For example, a complex reset may be executed in response to a start-up of the processing system 10a or in response to given (critical) errors, while a simple reset may be executed in response to a reset request by the processing unit 102. Generally, the reset events may be static/hardwired or may be configurable. For example, a possible programmable error handler circuit able to handle different error types is disclosed in Italian patent application IT 102018000003234, which is incorporated herein by reference.

Thus, also the firmware selection operation executed by the signature search module 1086 should be able to handle the reset types (simple and/or complex) supported by the processing system 10a.

Figure 10:
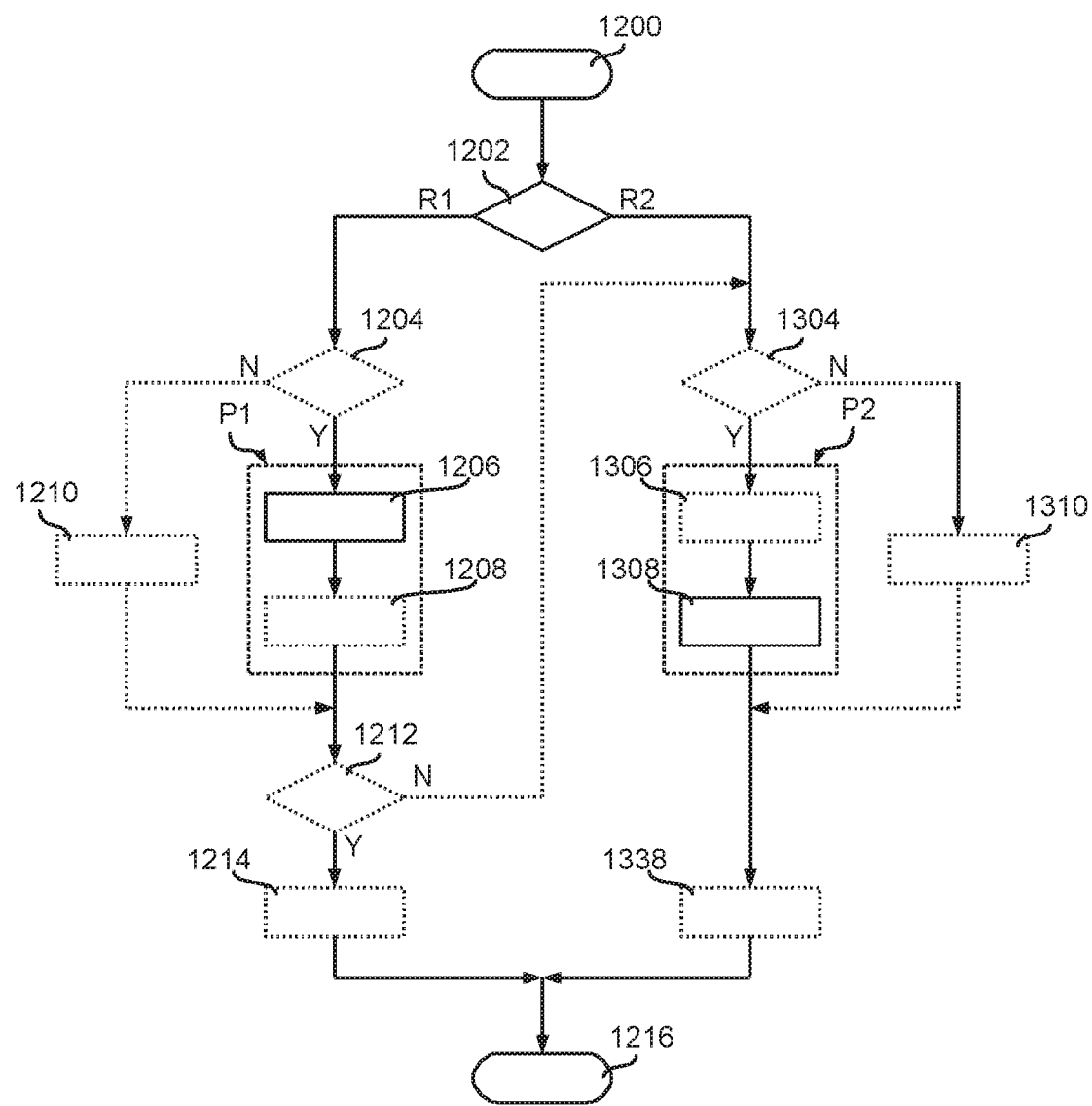
FIGS. 10, 11 and 12 shows an embodiment of a signature search module used to process the signature data in the processing systems of FIG. 5, 6 or 8.

FIG. 10 shows an embodiment of the operation of a signature search circuit 1086 configured to handle a complex reset.

Specifically, in the following will be assumed that the configuration data CD have already been distributed and accordingly, the configuration data OTA_CD are provided to the configuration module 108, in particular the signature search module 1086.

As described in the foregoing, in various embodiments, the signature search circuit 1086 is configured to permit that the firmware update function is enabled or disabled via the configuration data OTA_SIG. Generally, this is an optional feature and the update function may also be enabled always. For example, when the configuration data OTA_CD indicate that the firmware update function is disabled, the signature search module 1086 may not analyze the signature data OTA_SIG and simply set the signal FW_SEL to the value associated with a default firmware image, such as the firmware image FWA. Thus, in this case, a default firmware may also use the memory area associated with the other (disabled) firmware images, such as the memory area associated with the firmware image FWB. Conversely, when the configuration data OTA_SIG indicate that the firmware update function is enabled or when the firmware update function is always enabled, the signature search module 1086 should generate the selection signal FW_SEL as a function of the signature data OTA_SIG. For example, this may include the following steps:

identify the non-volatile memory sector where the signature data OTA_SIG are stored, e.g., as a function of the configuration data OTA_CD;

read the signature data OTA_SIG (at least the slots having stored data) in order to determine which software image shall be executed; and generate the firmware selection signal FW_SEL in order to signal the selection to the memory controller 120 (or 1040*a*).

Moreover, as described in the foregoing, the signature search circuit 1086 is activated upon each reset event (specifically, at the end of the configuration phase which starts in response to the reset signal RESET). For example, considering the exemplary embodiment of a complex reset executed by the reset module shown in FIG. 9, the reset module 116 is configured to generate at the step 1102 a first reset, while the second reset at the step 1108 may be optional or mandatory (see description of step 1104).

Thus, in various embodiments, the signature search module may be configured to perform the same operations in response to both reset events signaled at the steps 1102 and 1108, i.e. each time the signature search module 1086 is configured to read the signature data OTA_SIG and set the signature selection signal FW_SEL.

Conversely, FIG. 10 shows an embodiment, wherein the reset events signaled at the steps 1102 and 1108 are treated differently. Specifically, in the embodiment considered, the operations performed by the signature search module 1086 are split into two phases:

during the first phase P1 the signature data OTA_SIG are read at a step 1206; and during the second phase P2 the data read during phase P1 are validated and the signal FW_SEL is set at a step 1308 as a function of the signature data OTA_SIG already read during the first phase.

Generally, the processing of the signature data OTA_SIG in order to identify the firmware image to be used may be performed during the first phase P1 and/or the second phase P2. For example, in various embodiments, the firmware image to be used is determined during phase P1, and the processing system verifies and validates during phase P2 the decision taken during phase P1.

Specifically, the phases P1 and P2 may be executed differently based on whether the reset is complex or simple and whether a BIST is enabled or not. Specifically, the signature search circuit 1086 may:

in case of a simple reset, execute both phases P1 and P2;

in case of a complex reset with BIST disabled, execute both phases P1 and P2, insofar as no further reset is performed at step 1108; and in case of a complex reset with BIST enabled, execute the first phase P1 in response to the first type of reset (signaled at the step 1102 via the signal RM having the first value) and execute the second phase P2 in response to the second type of reset (signaled at the step 1108 via the signal RM having the first value).

This different operation is essentially based on the fact, that the first reset (at step 1102) is always executed, while the second reset may be optional.

As mentioned before, the processing of the signature data OTA_SIG in order to identify the firmware image to be used may be performed during the first and/or the second phase. For example, in various embodiments, the signature search circuit 1086 may manage during the read operation at the step 1206 at least one of: a slot or address register SCNT for storing a value indicative of a slot number or a memory address associated with a given slot, and a firmware index register FWCNT for storing a value indicative of the index of the updateable firmware to be used. Such registers may be implemented with flip-flops or also latches. In various embodiments, the register SCNT and/or the register FWCNT may indeed be implemented with a plurality of registers, such as three registers, and the respective value may be determined by applying a majority decision (e.g., "two out of three"). Specifically, the registers SCNT and FWCNT are configured to be reset only in response to the first reset event (steps 1102), i.e. these registers are configured to not reset their content when the reset mode signal RM has the second value, i.e. in response to the second reset event (steps 1108).

Accordingly, in this case, the signature search module 1086 may, at the step 1206 of phase P1, read the signature data OTA_SIG and set the registers SCNT and/or FWCNT as a function of the signature data OTA_SIG. At the step 1308 of phase P2, the signature search module 1086 may set the signal FW_SEL as a function of the content of the registers SCNT and/or FWCNT.

As mentioned before, in various embodiments, before setting the signal FW_SEL, the signature search circuit 1086 may verify/validate during the phase P2 the content of the registers SCNT and/or FWCNT at a step 1306.

For example, in various embodiments, the firmware selection signal FW_SEL is generated by storing respective data to at least one register TVF2. For example, in various embodiments, the same value is stored to three registers and the firmware selection signal FW_SEL is generated by performing a decision bases on a triple-voted decision, i.e. the firmware selection signal FW_SEL corresponds to the value stored in at least two of the three registers. Also any greater (preferably odd) number of registers may be used.

For example, when only two firmware images FWA and FWB may be stored, the firmware selection signal FW_SEL may have only a single bit and each register TVF2 may be implemented with a single flip-flop (or latch). Generally, instead of using a binary encoding, the firmware selection signal FW_SEL may also be encoded with other encoding schemes, such as a one-hot encoding. For example, in various embodiments, the firmware selection signal FW_SEL (and similarly each register TVF2) comprises a plurality of bits, such as 1, 2 or 4 bytes, and a first bit sequence corresponds to the reset value of the register TVF2 and different bit sequences are associated with the various firmware images (which optionally may include in addition to the updateable firmware memory areas FWA and FWB a system firmware and/or a factory default firmware). Preferably, each of these bit sequences has a value with is different from the other bit sequences for a plurality of bit values.

In various embodiments, also a temporary register TVF1 may be used. Preferably, this register TVF1 uses the same encoding as the register TVF2. Moreover, similar to the register TVF2, also the temporary register TVF1 may be implemented with a plurality of registers and by using a majority decision.

The use of the registers TVF1 and TVF2 has the advantage that the processing system 10*a* may verify whether the content of both registers corresponds, thereby permitting a detection of possible malfunctions. For example, in various embodiments, the register TVF2 is configured to be reset in response to both reset events (steps 1102 and 1108). Conversely, similar to the registers SCNT and/or FWCNT, the register TVF1 is configured to be reset only in response to the first reset event (i.e., when the reset mode signal TM has the first value, steps 1102), i.e. the register TVF1 is configured to not reset its content when the reset mode signal TM has the second value, i.e. in response to the second reset event (steps 1108).

Similarly, a BIST function of the processing system may be configured to verify only the operation of the register(s) TVF2, which includes an overwrite operation of the register(s) TVF2, i.e. the BIST function does not perform write operations to the register TVF1 (and similarly the registers SNT and FWCNT). Accordingly, when a second reset is generated at step 1108, e.g. once a BIST has been executed, the signature search circuit 1108 sets again the register(s) TVF2 and the content of the register(s) TVF2 should correspond to the content of the register(s) TVF1. Thus, the processing system 10a may verify whether both registers operate correctly.

Accordingly, in various embodiments, during the phase $P_1$, the signature search module 1086 may set the register TVF1 at an optional step 1208 as a function of the signature data OTA_SIG, e.g. as a function of the content of the registers SCNT and/or FWCNT.

Consequently, in the embodiment considered, once the signature search circuit 1086 is activated at a step 1200 (i.e. in response to the signal RESET generated by the reset circuit 116), the signature search circuit 1086 may verify at the step 1202 the reset type. For example, as mentioned before, the signature search circuit 1086 may analyze the reset type signal RM provided by the reset circuit 116 for this purpose. Based on the reset type, the signature search circuit 1086 starts the first phase P1 (left part of FIG. 10) or the second phase P2 (right part of FIG. 10)

Specifically, in case the reset type signal RM has the first value corresponding to a reset generated at the step 1102 (output "Rb" of the verification step 1202), the signature search circuit 1086 proceeds to an optional verification step 1204. Specifically, the verification step 1204 is used to verify whether the update feature is enabled. For example, as described in the foregoing, the signature search circuit 1086 may analyze for this purpose the configuration data OTA_SIG. This step 1204 is optional, because the update feature may also be enabled always.

In case, the update feature is enabled (output "Y" of the verification step 1202), the signature search circuit 1086 starts the first phase Pb.

During the first phase Pb, the signature search circuit 1086 reads the signature data OTA_SIG and optionally sets the content of the registers SCNT and/or FWCNT as a function of the signature data OTA_SIG. Optionally, the signature search circuit 1086 sets also the content of the register TVF1 at the step 1208.

Generally, based on the specific implementation of the processing system 10a the signature search circuit 1086 may then perform different operations. This is schematically shown by an optional verification step 1212. For example, in the embodiment considered, the signature search circuit 1086 is able to handle (at least) a complex reset wherein the self-test function may be enabled or disabled via the configuration data CD (see also step 1104 of FIG. 9). As mentioned before, in case of a complex reset, the signature search circuit 1086 may be configured to:
  when the self-test is disabled, execute both phases P1 and P2, insofar as no further reset is performed at step 1108; and
  when the self-test is enabled, execute the first phase P1 in response to the first type of reset (signaled at the step 1102) and execute the second phase P2 in response to the second type of reset (signaled at the step 1108).

Accordingly, in this case, the signature search circuit 1086 may verify at the step 1212 whether the configuration data CD indicate that the BIST function is enabled or disabled.

In case the BIST function is disabled (output "N" of the verification step 1212), the signature search circuit 1086 proceeds to the execution of the second phase P2, which will be described in greater detail in the following In case the BIST function is enabled (output "Y" of the verification step 1212), the signature search circuit 1086 may terminate the execution at a stop step 1216, thereby waiting that the signature search circuit 1086 is started again at the step 1200 in response to the next reset event, corresponding to the reset generated at the step 1108.

As mentioned before, in various embodiments, the BIST function may be performed by a suitable system firmware executed by the processing unit 102. For example, in this case, the signature search circuit 1086 may set at a step 1214 (between the steps 1212 and 1216) the register TVF2 (and thus also the selection signal FW_SEL) to a value associated with the system firmware.

In case the update feature is disabled (output "N" of the verification step 1204), the signature search circuit 1086 may set at a step 1210 the register(s) TVF1 (if used) to the value associated with the default firmware, e.g. firmware image FWA, and proceed to the verification step 1212.

Generally, the verification step 1212 is purely optional, because the BIST function may also be always enabled for a complex reset, i.e. the signature search circuit 1086 may proceed (at the end of the step 1210 and the step 1212) directly to the stop step 1216 or the optional step 1214.

In the embodiment considered, the second phase P2 is thus started when the update function is enabled and when either the self-test is enabled and a reset occurs at the step 1108 or the self-test is disabled.

Specifically, in the embodiment shown in FIG. 10, when the self-test is enabled, the signature search circuit 1086 terminates the first phase P1 and waits for a new reset. Accordingly, in response to a new reset, the signature search circuit 1086 is started again at the step 1200 and the signature search circuit 1086 verifies at the step 1202 the type of reset. Specifically, in case the reset is now of the second type of reset corresponding to a reset generated at the step 1108 (output "R2" of the verification step 1202), the signature search circuit 1086 proceeds to an optional verification step 1304.

Specifically, the verification step 1304 is used to verify whether the update feature is enabled. For example, as described in the foregoing, the signature search circuit 1086 may analyze for this purpose the configuration data OTA_SIG. Similar to the step 1204, also this step 1304 is optional, because the update feature may also be enabled always. Accordingly, in the embodiment considered, when the self-test is disabled at the end of phase P1 (output "N" of the verification step 1234), the signature search circuit 1086 may proceed directly to the verification step 1304.

In case, the update feature is enabled (output "Y" of the verification step 1202), the signature search circuit 1086 starts thus the second phase P2. As mentioned before, during the second phase P2, the signature search circuit 1086 may verify/validate at a step 1306 the content of the registers SCNT and/or FWCNT (if used) and set at the step 1308 the content of the register TVF2 as a function of the signature data OTA_SIG, e.g., as a function of the content of the registers SCNT and/or FWCNT. Accordingly, at the end of the step 1308, the firmware selection signal FW_SEL is set and the procedure terminates at the step 1216.

Conversely, in case the update feature is disabled (output "N" of the verification step 1204), the signature search circuit 1086 may set at a step 1310 the register(s) TVF2 to the value associated with the default firmware, e.g. firmware image FWA, and the procedure terminates at the step 1216.

Figure 11:
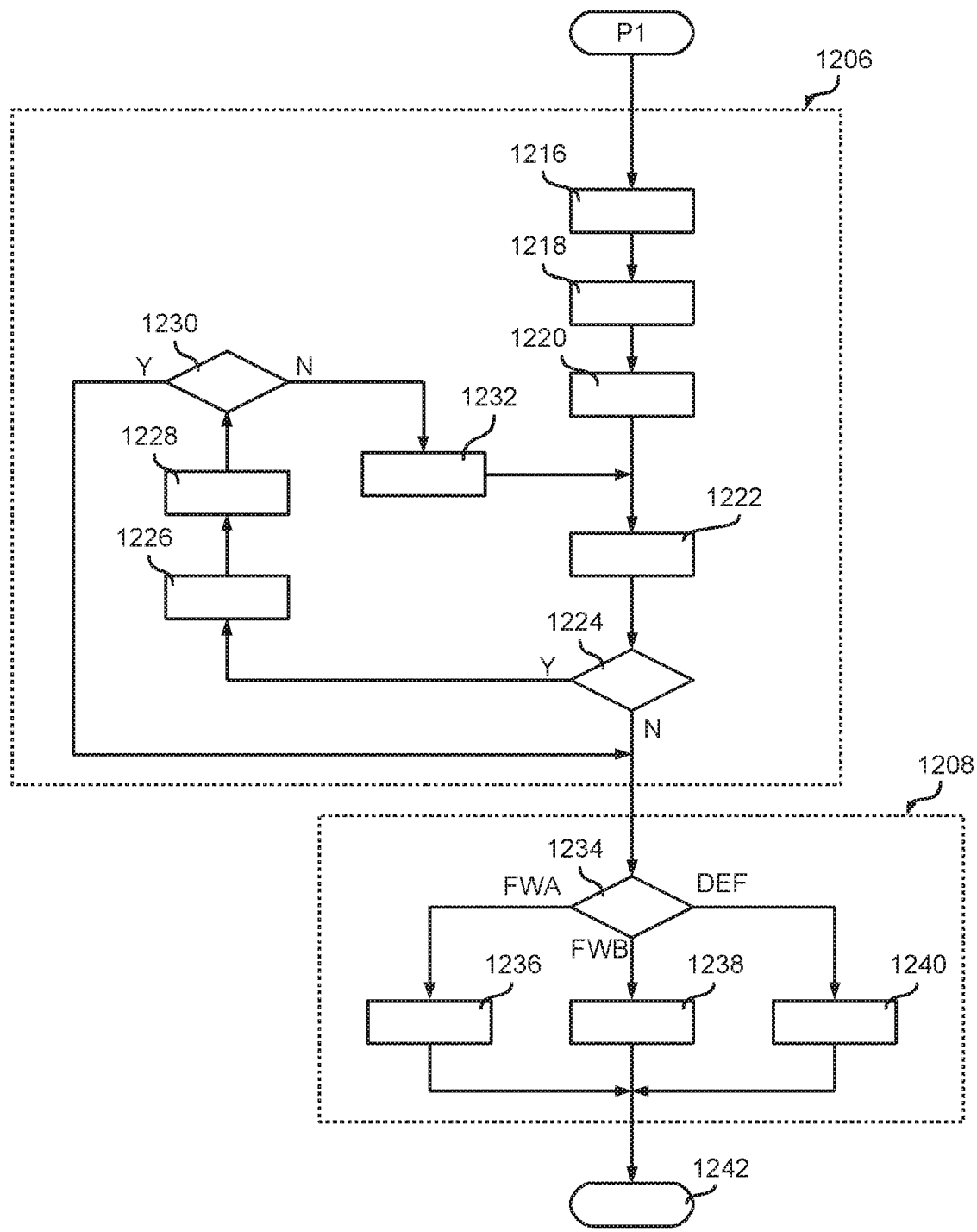

A possible embodiment of the first phase P1 is shown in FIG. 11.

Without loss of generality, it will be assumed that only two updateable firmware memory areas FWA and FWB are supported. However, the program memory 104a may also comprise further (non-updateable) firmware images, such as a system firmware and/or a factory default firmware, which may be selected in a different manner, e.g. in response to given events or when the firmware images FWA and/or FWB are not programmed.

As mentioned before, during phase P1, the signature search circuit 1086 should read the signature data OTA_SIG at a step 1206 and optionally set the register TVF1 at a step 1208.

For example, in the embodiment considered, the signature search circuit 1086 is configured to read sequentially the slots of the signature data OTA_SIG in order to determine the last written signature slot containing correct signature data. For example, in the embodiment considered, the signature search circuit 1086 determines at a step 1216 the start address of the signature data OTA_SIG. For example, as mentioned before, the configuration data OTA_CD may comprise data specifying the start-address of the signature data OTA_SIG, such as directly the start-address or an index to one of a plurality of possible memory areas, wherein a given fixed start-address is associated with each memory area. Generally, the start-address may also be fixed.

In the embodiment considered, the signature search circuit 1086 stores at a step 1218 the first slot index (e.g. "1") or the start-address to the register SCNT. Moreover, the signature search circuit 1086 sets the value of the register FWCNT to a reset value, e.g. zero.

Next, the signature search circuit 1086 sets the memory address (e.g., signal ADDRb shown in FIG. 6) to the start-address associated with the first slot and proceeds to a step 1222, where the respective signature data stored at the provided memory address are read.

Next, the signature search circuit 1086 verifies at a step 1224 whether the signature data received correspond to a correct signature, e.g. whether the data are programmed and contain a given bit sequence. Generally, the signature data stored to the slots may be defined based on the specific application. Specifically, in the embodiment considered, it is sufficient that the signature search circuit 1086 is able to determine whether a correct signature has been programmed to a given slot, in order to determine the last correctly programmed slot.

In case a correct signature was read (output "Y" of the verification step 1224), the signature search circuit 1086 stores at a step 1226 the current slot index or the respective memory address to the register SCNT, which as will be described in greater detail in the following contains thus data identifying the last slot having stored correct signature data.

In the embodiment considered, the signature search circuit 1086 determines at a step 1228 the index of the firmware image associated with the respective slot. For example, when the firmware areas are programmed sequentially, also the content of the register FWCNT may be simply increased. However, in line with the previous description, the firmware index stored to the register FWCNT may also be determined as a function of data stored in the signature data, which e.g. may comprise directly a firmware index. Thus, in various embodiments, the registers SCNT and FWCNT may indeed comprise redundant information, insofar as the content of the register SCNT or FWCNT may be calculated from the value of the other register, and thus one of the registers may also be omitted. However, the use of two separate registers permits also to perform further diagnostic operations as will be described in the following with respect to the operations performed at the step 1306.

Next, the signature search circuit 1086 determines at a step 1230 whether the current slot was the last slot in the signature data OTA_SIG.

In case the current slot was not the last slot (output "N" of the verification step 1230), the signature search circuit 1086 sets at a step 1232 the memory address (e.g., signal ADDRb shown in FIG. 6) to the next memory address, i.e. increases the current memory address and proceeds again to the step 1222, thereby reading the data stored to the next slot.

Accordingly, the steps 1222-1232 are repeated until an incorrect/empty slot is read or the last slot has been read.

Specifically, in both cases (output "N" of the verification step 1224 and output "Y" of the verification step 1230) the signature search circuit 1086 proceeds to the optional step 1208 where the content of the register(s) TVF1 is set as a function of the content of the register FWCNT (or alternatively the register SCNT).

For example, in the embodiment considered where only two updateable firmware images are supported, the signature search circuit 1086 may verify at a step 1234 whether the value of the register FWCNT is associated with the first firmware image FWA or the second firmware image FWB. For example, in various embodiments, the firmware image FWA is selected when the register FWCNT has an even value and the firmware image FWB is selected when the register FWCNT has an odd value. Optionally, the signature search circuit 1086 may verify whether the register FWCNT has still the reset value, which indicates that no valid signature has been found. In this case the signature search circuit 1086 may select a default firmware, such as a system firmware or factory-default firmware, or also the firmware FWA.

Accordingly, in case value of the register FWCNT is associated with the first firmware image FWA (output "FWA" of the verification step 1234), the signature search circuit 1086 sets at a step 1236 the register(s) TVF1 to the value associated with the firmware image FWA. Conversely, in case value of the register FWCNT is associated with the second firmware image FWB (output "FWB" of the verification step 1234), the signature search circuit 1086 sets at a step 1238 the register(s) TVF1 to the value associated with the firmware image FWB. Optionally, in case value of the register FWCNT has the reset value (output "DEF" of the verification step 1234), the signature search circuit 1086 sets at a step 1240 the register(s) TVF1 to the value associated with the default firmware image.

Thus, in the embodiment considered, at the end of the step 1208, the first phase P1 ends at a step 1242 and the register SCNT contains data identifying the last slot index or address having stored correct signature data (except for the first read operation), the register FWCNT contains data identifying the index of the updateable firmware to be used and the register TVF1 contains a copy of the firmware selection signal FW_SEL. Generally, as mentioned in the foregoing, one of the registers SCNT or FWCNT may thus be omitted, and also the register TVF1 is optional. In fact, assuming that the selection of the firmware image to be used is performed implicitly via the slot number of the last (correctly) written slot OTA_SIG1 ... OTA_SIGn, and assuming that only two updateable firmware images FWA and FWB are supported, the firmware image to be used may be selected by using a modulo 2 (mod 2) operation of the last slot number having stored a correct signature (as stored in the register SCNT), e.g. by using the last bit of the slot number, or another value being indicative for the slot number, such as the memory address associated with the slot of the first slot number having stored an incorrect signature (e.g. an empty signature).

Figure 12:
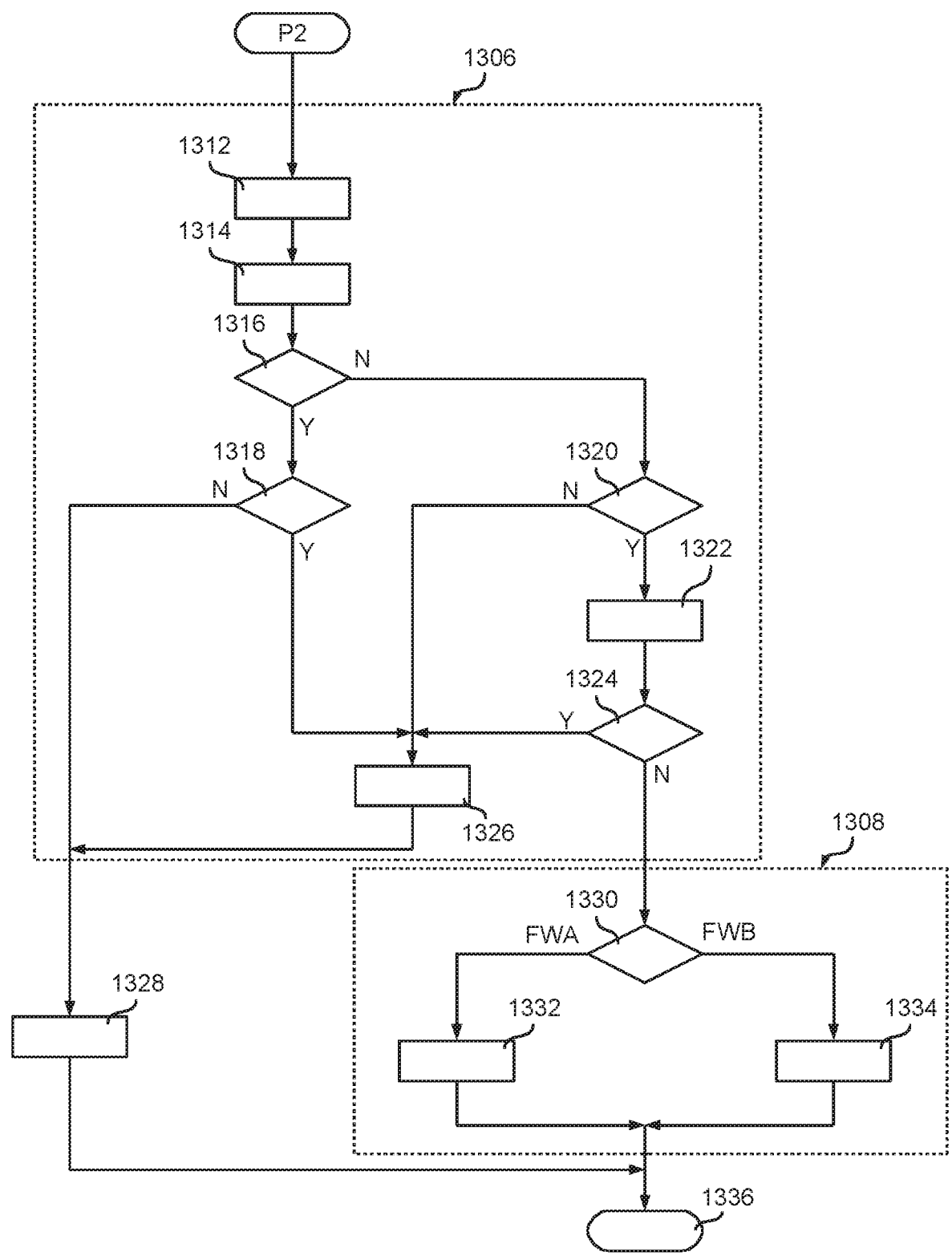

Instead FIG. 12 shows an embodiment of the second phase P2. As mentioned before, in phase P2 the signature search circuit 1086 should set the register(s) TVF2 at a step 1308 and optionally perform one or more preliminary verification operation at a step 1306 in order to verify whether the data stored during the first phase P1 are congruent.

For example, in the embodiment considered, the signature search circuit 1086 obtains first the data stored during the first phase P1. For example, at a step 1312 the content of the register SCNT indicating the last slot having stored a correct signature, and at a step 1314 the content of the register FWCNT indicating the index of the updateable firmware image to be used.

Accordingly, in the embodiment considered, the signature search circuit 1086 may verify whether these data are correct. For example, in the embodiment considered, the signature search circuit 1086 verifies at a step 1316 whether the register FWCNT has still the reset value.

Specifically, in case the register FWCNT has still the reset value (output "Y" of the verification step 1316), the signature search circuit 1086 may set at a step 1316 the content of the register(s) TVF2 to the value associated with a default firmware, such as the previous described system or factory-default firmware, or the unprogrammed first firmware area FWA.

Specifically, in the embodiment considered, the signature search circuit 1086 performs indeed an additional optional verification at a step 1318 in order to determine whether the first signature slot OTA_SIG1 contains also incorrect/empty signature data, because otherwise the register FWCNT should not have the reset value.

Accordingly, in the embodiment considered, when the first signature slot OTA_SIG1 contains valid data (output "Y" of the verification step 1318), the content of the registers FWCNT is incorrect and the signature search circuit 1086 may proceed to an error handling step 1326, where an error flag is set. In the embodiment considered, the signature search circuit 1086 proceeds then to the step 1328 where the default firmware is selected. However, also a different firmware may be selected in case of an error. Conversely, when the first signature slot OTA_SIG1 is empty/does not contain valid data (output "N" of the verification step 1318), the signature search circuit 1086 may proceed directly to the step 1328.

Conversely, in case the register FWCNT has a value being different from the reset value (output "N" of the verification step 1316), at least one valid slot has been read during the first phase P1. Accordingly, also the content of the register SCNT should refer to the last correctly programmed signature slot.

For example, in the embodiment considered, in this case the signature search circuit 1086 verifies at a step 1320 whether the signature slot indicated by the register SCNT contains a valid signature.

In case the signature stored to this slot is invalid/empty (output "N" of the verification step 1320), the signature search circuit 1086 may proceed to the error handling step 1326.

Conversely, in case the signature stored to this slot is correct (output "Y" of the verification step 1320), the signature search circuit 1086 may select at a step 1322 the next slot and verify at a step 1324 whether also the next slot contains correct signature data.

Specifically, due to the fact that the previous slot should be the last slot, this slot should contain incorrect/unprogrammed data. Accordingly, in case the next slot contains correct signature data (output "Y" of the verification step 1324), the signature search circuit 1086 may proceed to the error handling step 1326.

Conversely, in case the next slot contains incorrect/empty signature data (output "N" of the verification step 1324), the data FWCNT and SCNT are congruent and the signature search circuit 1086 may proceed to the step 1308 for setting the register TVF2.

For example, in the embodiment considered where only two updateable firmware images are supported, the signature search circuit 1086 may verify at a step 1328 whether the value of the register FWCNT is associated with the first firmware image FWA or the second firmware image FWB. For example, in various embodiments, the firmware image FWA is selected when the register FWCNT has an even value and the firmware image FWB is selected when the register FWCNT has an odd value.

For example, in the embodiment considered, the signature search circuit 1086 analyzes the content of the register FWCNT at a step 1330. In case the value of the register FWCNT is associated with the first firmware image FWA (output "FWA" of the verification step 1330), the signature search circuit 1086 sets at a step 1332 the register(s) TVF2 to the value associated with the firmware image FWA. Conversely, in case value of the register FWCNT is associated with the second firmware image FWB (output "FWB" of the verification step 1330), the signature search circuit 1086 sets at a step 1334 the register(s) TVF2 to the value associated with the firmware image FWB.

Once the register(s) TVF2 have been set (at the end of steps 1328 and 1308), thereby setting the firmware selection signal FW_SEL, the second phase P2 ends at a stop step 1336.

As mentioned before, at the end of the procedure shown in FIG. 10, the content of the registers TVF1 and TVF2 should be the same. Accordingly, the signature search circuit 1086 may also verify at step 1338 whether the content of these registers corresponds, and if the content does not correspond, the signature search circuit 1086 may proceed to the error step 1324.

Alternatively or additionally, the content of the registers TVF1 and TVF2 may be provided to the memory controller 120 (or 1040*a*), which may verify whether the data correspond.

As described in the foregoing, the embodiment shown in FIG. 10 essentially is able to handle a complex reset with BIST function enabled or disabled. Specifically, the inventor has observed that the proposed verification operations render a complex reset particular robust, because signature data are read a first time (completely) during phase P1 in order to determine the target firmware and a second time (partially) during phase P2 in order to verify/validate the result of phase P1.

Generally, the same embodiment may also be used for a simple reset by simply proceeding at the end of steps 1208 and 1210 to step 1304, essentially implementing the operation of a complex reset where the BIST function has been disabled. For example, the signature search circuit 1086 may verify at the step 1212 whether the reset mode signal RM indicates a simple reset.

Alternatively, the signature search circuit 1086 may proceed from step 1206 directly to step 1308, thereby omitting the optional step 1208 (setting of register TVF1), the optional step 1212 (verification of BIST function) and the optional step 1306 (additional verification operations). Accordingly, in this case, the data would not be verified.

Finally, also the result of the step 1208 could be used directly to determine the firmware selection signal FW_SEL. Thus, in this case, a simple reset would only execute phase P1, whereas phase P1 and P2 would be executed for a complex reset.

In various embodiments, the system safety may be improved by using a redundant configuration, wherein indeed two redundant signature search circuits are used in order to verify whether both circuits provide the same result. For example, this may be useful in case the steps 1208 and 1306 are omitted. Generally, this applies both to a simple reset and a complex reset.

Various embodiments of the present disclosure permit thus that the update feature may be selectively enabled as a function of configuration data OTA_CD. In various embodiments, also the memory area where the signature data OTA_SIG are stored may be configurable via the configuration data OTA_CD.

Generally, due to the fact that the specific content of the signature data may be adapted to the specific application needs, it is possible to select, e.g., a robust configuration (e.g., by verifying whether at least a given number of bits has been written to a given slot, thereby reducing the influence of a bit-flipping errors of the signature data OTA_SIG) and/or a secure configured (e.g., by encrypting/decrypting the content of each signature slot).

Moreover, in various embodiments (see e.g. FIG. 10), the signature search is executed in two different phase P1 and P2. During phase P1 the signature data are analyzed and some data may be stored (e.g., TVF1, SCNT, FWCNT). Conversely, during phase P2 these data may be used for further verifications, thereby permitting the detection of possible malfunctions.

In various embodiments, the content of at least part of the registers TVF1, TVF2, SCNT and FWCNT may also be readable by the processing unit 102, which thus may verify whether the correct decision was made (e.g., the software may verify the content of the registers SCNT and FWCNT, read the content of the respective signature slot and possible also the next slot, etc.).

By using (at least in part) a redundant configuration, e.g. for the registers TVF1, TVF2, SCNT and/or FWCNT, safety and security may be further improved.

In various embodiments, the content of the registers TVF1 and TVF2 may be provided separately to memory controller, which thus may also verify whether the signals correspond. This reduces the risk of a single fault. Specifically, while malfunction in specific sub-circuit of the signature search circuit 1086 (e.g. the circuit implementing the decision at step 1208) can generate incorrect signals (e.g., an incorrect content for the register TVF1), it is unlikely that also a second essentially redundant sub-circuit of the signature search circuit 1086 (e.g. the circuit implementing the decision at step 1330) will generate the same incorrect signals (e.g., the same incorrect content for the register TVF2).

In various embodiments, the signature data OTA_SIG may be written to a protected memory area of the non-volatile memory 104*a*, thereby limiting write and possibly also read access to the protected memory area. For example, write access may only be enabled when the processing unit 102 provides a given security key to the memory controller of the non-volatile memory 104*a*, thereby enabling write access to the protected memory area. For example, this may be useful when the update process is handled by a separate system firmware, insofar as the security key is not transmitted with the firmware images to be updated.

In various embodiments, the firmware selection signal FW_SEL is provided to the non-volatile memory controller 120 or 1040*a*, whose task is to taken the address (e.g., signal ADRa shown in FIG. 6) of a transaction, requested by some system masters (e.g., the processing unit 102 or a DMA controller) and translate the address into the address to be sent to the non-volatile memory in order to read or write the data (e.g., signal ADRa' shown in FIG. 6).

As described in the forgoing, in response to a reset at step 1102 the signature search circuit 1086 performs a sequential search of the first non-programmed signature slot OTA_SIG1 . . . OTA_SIGn. The time requested for this operation increases with the number of written signatures. However, by limiting the number of slots, the requested time is usually still be acceptable, in particular during the start-up of the processing system.

Generally, by using signature slots having a fraction of bits of the data signal used to read data from the program memory 104*a* (e.g. the data signal DATAa' shown in FIG. 6) plural consecutive signature slots may be read contemporaneously and the signature search circuit 1086 may process these plural consecutive signature slots in parallel. For example, in various embodiments, each slot may have 1 byte and the data signal DATAa' may have 4 bytes.

In various embodiments, each slot may have only a single bit. In this case, the signature search circuit 1086 may use a binary search in order to determine the first unprogrammed signature slot/bit. Alternatively, when using only two programmable firmware images, the signature search circuit 1086 may calculate a parity bit for the signature data OTA_SIG and select the first image FWA when the parity bit has a first logic value and the second image FWB when the parity bit has a second logic value. For example, this may be useful, when the signature data are stored in a one-time programmable memory, e.g., implemented with fuses.

Thus, in general, the signature search circuit may also simultaneously read plural (or also all) signature slots OTA_SIG1 . . . OTA_SIGn and process these plural (or also all) signature slots OTA_SIG1 . . . OTA_SIGn at least in part in parallel.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a digital processing unit;
   one or more non-volatile memories configured to store a firmware to be executed by the digital processing unit,
   a diagnostic circuit configured to execute a self-test operation of the processing system in response to a diagnostic mode enable signal; and a reset circuit configured to perform a complex reset of the processing system by:
  generating a first reset of the processing system in response to a given event, wherein the processing system is configured to set the diagnostic mode enable signal in response to the first reset, thereby activating execution of the self-test operation;
  generating a second reset of the processing system once the self-test operation has been executed;
wherein the one or more non-volatile memories comprise a first programmable memory area for storing a first updateable firmware image, a second programmable memory area for storing a second updateable firmware image and a third memory area for storing signature data;
wherein the processing system is configured to execute the first firmware image or the second firmware image as a function of a firmware selection signal;
wherein the processing system comprises a signature search circuit configured to generate the firmware selection signal as a function of the signature data; and
wherein the signature search circuit is configured to read the signature data in response to the first reset and to, in response to the second reset, generate the firmware selection signal as a function of the signature data read in response to the first reset.

2. The processing system according to claim 1, wherein the one or more non-volatile memories comprise a fourth memory area for storing configuration data, wherein the configuration data comprise configuration data for selectively enabling the signature search circuit will or the self-test operation.

3. The processing system according to claim 1, further comprising a memory controller configured to interface the digital processing unit with the one or more non-volatile memories, wherein the memory controller is configured to receive an address signal from the digital processing unit and generate a modified address signal for accessing the one or more non-volatile memories by performing an address translation operation as a function of the firmware selection signal.

4. The processing system according to claim 1, further comprising a communication interface, wherein the processing system is configured to:
  receive a firmware image via the communication interface;
  store the received firmware image to the first or second programmable memory area; and
  update the signature data.

5. The processing system according to claim 1, wherein the reset circuit is configured to generate a reset signal and a reset mode signal, wherein the reset circuit is configured to:
  in response to the given event, generate a reset trigger in the reset signal and set the reset mode signal to a first value, thereby indicating the first reset of the processing system, and
  once the self-test operation has been executed, generate the reset trigger in the reset signal and set the reset mode signal to a second value, thereby indicating the second reset of the processing system.

6. The processing system of claim 1, wherein the processing system is integrated in a micro-controller.

7. A method of operating a processing system according claim 1, the method comprising:
  in response to a given event, generating a first reset of the processing system;
  in response to the first reset, reading the signature data;
  in response to the first reset, setting the diagnostic mode enable signal, thereby activating execution of the self-test operation;
  once the self-test operation has been executed, generating a second reset of the processing system; and
  in response to the second reset, generating the firmware selection signal as a function of the signature data read in response to the first reset.

8. A processing system comprising:
a digital processing unit;
one or more non-volatile memories configured to store a firmware to be executed by the digital processing unit,
a diagnostic circuit configured to execute a self-test operation of the processing system in response to a diagnostic mode enable signal; and
a reset circuit configured to perform a complex reset of the processing system by:
  generating a first reset of the processing system in response to a given event, wherein the processing system is configured to set the diagnostic mode enable signal in response to the first reset, thereby activating execution of the self-test operation;
  generating a second reset of the processing system once the self-test operation has been executed;
wherein the one or more non-volatile memories comprise a first programmable memory area for storing a first updateable firmware image, a second programmable memory area for storing a second updateable firmware image and a third memory area for storing signature data;
wherein the third memory area for storing signature data comprises a plurality of memory slots having the same number of bits, wherein respective signature data may be stored in each memory slot;
wherein the processing system is configured to execute the first firmware image or the second firmware image as a function of a firmware selection signal;
wherein the processing system comprises a signature search circuit configured to generate the firmware selection signal as a function of the signature data; and
wherein the signature search circuit is configured to read the signature data in response to the first reset and to, in response to the second reset, generate the firmware selection signal as a function of the signature data read in response to the first reset.

9. The processing system according to claim 8, wherein the processing system is configured so that the signature data are written to the third memory area by storing respective signature data sequentially to the memory slots, and wherein the signature search circuit is configured to sequentially read the memory slots in order to determine the last memory slot having stored valid signature data.

10. The processing system according to claim 9, wherein the signature data written to each memory slot comprise data identifying a respective programmable memory area for storing an updateable firmware image, and wherein the signature search circuit is configured to generate the firmware selection signal as a function of the signature data written to the last memory slot having stored valid signature data.

11. The processing system according to claim 9, wherein each memory slot is univocally associated with a respective programmable memory area for storing an updateable firmware image, and wherein the signature search circuit is configured to determine the firmware selection signal as a function of a slot number of the last memory slot having stored valid signature data.

12. The processing system according to claim 9, wherein the signature search circuit is configured to:
   in response to the first reset, store data identifying a slot number of the last memory slot having stored valid signature data to a first register, wherein the first register is configured to maintain its value in response to the second reset; and
   in response to the second reset:
      read the content of the first register,
      verify whether the memory slot identified by the content of the first register contains valid signature data,
      verify whether the next memory slot contains invalid signature data, and
      in case the memory slot identified by the content of the first register contains invalid signature data or the next memory slot contains valid signature data, generate an error signal.

13. The processing system according to claim 12, wherein the first register is implemented with a plurality of redundant registers.

14. The processing system according to claim 9, wherein the signature search circuit is configured to generate the firmware selection signal as a function of the signature data read in response to the first reset by:
   in response to the first reset:
      select the first or second programmable memory area for storing an updateable firmware image as a function of the signature data;
      store data identifying the selected programmable memory area to a second register, wherein the second register is configured to maintain its value in response to the second reset; and
   in response to the second reset:
      read the content of the second register; and
      generate the firmware selection signal as a function of the content of the second register.

15. The processing system according to claim 14, wherein the second register is implemented with a plurality of redundant registers.

16. A method of operating a processing system that comprises a digital processing unit and one or more non-volatile memories storing firmware to be executed by the digital processing unit, the method comprising:
   generating a first reset of the processing system in response to a given event;
   generating a firmware selection signal as a function of signature data stored in a third memory area of the one or more non-volatile memories;
   reading the signature data in response to the first reset;
   setting a diagnostic mode enable signal in response to the first reset, thereby activating execution of a self-test operation;
   generating a second reset of the processing system once the self-test operation has been executed;
   regenerating the firmware selection signal as a function of the signature data read in response to the first reset and the second reset; and
   executing a first firmware image or a second firmware image as a function of the regenerated firmware selection signal, the first and second firmware images comprising a first updatable firmware image stored in a first programmable memory area of the one or more non-volatile memories and a second updatable firmware image stored in a second programmable memory area of the one or more non-volatile memories.

17. The method according to claim 16, wherein the self-test operation is selectively enabled by configuration data stored in a fourth memory area of the one or more non-volatile memories.

18. The method according to claim 16, further comprising generating an address signal for accessing the one or more non-volatile memories by performing an address translation operation as a function of the firmware selection signal.

19. The method according to claim 16, further comprising:
   receiving a firmware image;
   storing the received firmware image to the first or second programmable memory area; and
   updating the signature data.

20. The method according to claim 16, wherein generating the first reset comprises generating a reset trigger in a reset signal and setting a reset mode signal to a first value; and
   wherein generating the second reset comprises generating the reset trigger in the reset signal and setting the reset mode signal to a second value.

* * * * *